(12) United States Patent
Mukherjee et al.

(10) Patent No.: US 11,374,614 B1
(45) Date of Patent: Jun. 28, 2022

(54) IN-DEVICE COEXISTENCE FOR NEW RADIO

(71) Applicant: Charter Communications Operating, LLC, St. Louis, MO (US)

(72) Inventors: Amitav Mukherjee, Elk Grove, CA (US); Frank Azcuy, Miami, FL (US); Maulik Vaidya, Escondido, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/175,389

(22) Filed: Feb. 12, 2021

(51) Int. Cl.
*H04B 1/525* (2015.01)
*H04W 36/20* (2009.01)
*H04W 72/04* (2009.01)
*H04W 88/06* (2009.01)
*H04W 72/08* (2009.01)

(52) U.S. Cl.
CPC ............ *H04B 1/525* (2013.01); *H04W 36/20* (2013.01); *H04W 72/0453* (2013.01); *H04W 72/082* (2013.01); *H04W 88/06* (2013.01)

(58) Field of Classification Search
CPC .. H04B 1/525; H04W 36/20; H04W 72/0453; H04W 72/082; H04W 88/06
USPC .................................................. 455/88, 63.3
See application file for complete search history.

(56) References Cited

U.S. PATENT DOCUMENTS

| | | | | |
|---|---|---|---|---|
| 9,503,245 | B1 * | 11/2016 | Choi | H04W 72/1215 |
| 9,717,009 | B2 * | 7/2017 | Zhang | H04W 24/08 |
| 10,187,807 | B2 * | 1/2019 | Li | H04B 17/318 |
| 10,201,000 | B2 * | 2/2019 | Cheng | H04W 72/082 |
| 10,219,167 | B2 * | 2/2019 | Li | H04W 16/28 |
| 10,334,446 | B2 * | 6/2019 | Ashrafi | H04B 7/024 |
| 10,334,614 | B1 * | 6/2019 | Choi | H04W 72/1215 |
| 10,374,710 | B2 * | 8/2019 | Ashrafi | H04B 10/2581 |
| 10,440,584 | B1 * | 10/2019 | Labadie | H04W 16/14 |
| 10,491,303 | B2 * | 11/2019 | Ashrafi | H01Q 21/0025 |
| 10,715,215 | B2 * | 7/2020 | Wang | H04B 5/0043 |

(Continued)

OTHER PUBLICATIONS

3GPP TSG RAN Meeting #88e, RR-200902, Revised SID: Study on supporting NR from 52.6GHz to 71 GHz, Jun. 29 to Jul. 3, 2020, 3 pages.

(Continued)

*Primary Examiner* — Hai V Nguyen
(74) *Attorney, Agent, or Firm* — Straub & Straub; Michael P. Straub; Stephen T. Straub

(57) ABSTRACT

A network control device, e.g., a gNB, receives a message from a communications device, e.g. a UE, indicating that the communications device is experiencing an in-device coexistence (IDC) problem, e.g. in the 52.6 GHz-71 GHz frequency range with respect to NR-U and WiGig. The message is one of: i) an IDC assistance message indicating that the victim system is Wi-Gig or ii) an antenna panel switch message requesting that the network control device instruct the communications device to change the antenna panel that it uses for uplink NR signaling. The network control device generates and sends a response message to the communications device including: a selected new frequency to be used by the communications device for uplink NR signaling or a selected different antenna panel to be used by the communications device for uplink NR signaling. The communications device implements the change reducing or avoiding the IDC problem.

20 Claims, 22 Drawing Sheets

(56) References Cited

U.S. PATENT DOCUMENTS

| | | | | |
|---|---|---|---|---|
| 10,778,332 | B2* | 9/2020 | Ashrafi | H04B 10/541 |
| 10,784,962 | B2* | 9/2020 | Ashrafi | H04B 10/541 |
| 10,897,772 | B2* | 1/2021 | Ingale | H04W 72/1215 |
| 10,903,906 | B2* | 1/2021 | Ashrafi | H01Q 21/065 |
| 10,911,961 | B2* | 2/2021 | Dayal | H04W 72/1215 |
| 10,999,148 | B2* | 5/2021 | Van Der Velde | H04B 1/036 |
| 11,064,057 | B2* | 7/2021 | Sabella | H04W 4/40 |
| 11,088,755 | B2* | 8/2021 | Ashrafi | H04B 7/15507 |
| 11,095,352 | B2* | 8/2021 | Kung | H04W 48/16 |
| 11,129,239 | B2* | 9/2021 | Liu | H04L 12/66 |
| 11,202,335 | B2* | 12/2021 | Ashrafi | H04B 7/0871 |
| 11,218,264 | B2* | 1/2022 | Li | H04L 5/0048 |
| 11,228,880 | B2* | 1/2022 | Aldana | H04W 28/22 |
| 11,240,664 | B2* | 2/2022 | Lee | H04W 12/06 |
| 2013/0329681 | A1* | 12/2013 | Sebire | H04W 72/1215 |
| | | | | 370/328 |
| 2013/0337815 | A1* | 12/2013 | Sebire | H04W 36/0055 |
| | | | | 455/438 |
| 2015/0098377 | A1* | 4/2015 | Amini | H04W 72/0446 |
| | | | | 370/311 |
| 2015/0139015 | A1* | 5/2015 | Kadous | H04W 36/00837 |
| | | | | 370/252 |
| 2017/0055193 | A1* | 2/2017 | Mueck | H04W 16/14 |
| 2017/0181199 | A1* | 6/2017 | Agarwal | H04W 74/002 |
| 2017/0201997 | A1* | 7/2017 | Cheng | H04W 72/082 |
| 2017/0373903 | A1* | 12/2017 | Shimodaira | H04W 4/80 |
| 2018/0084438 | A1* | 3/2018 | Li | H04W 16/28 |
| 2018/0084439 | A1* | 3/2018 | Li | H04B 7/088 |
| 2018/0324618 | A1* | 11/2018 | Chay | H04W 72/1215 |
| 2018/0343567 | A1* | 11/2018 | Ashrafi | H04L 41/0816 |
| 2019/0098564 | A1* | 3/2019 | Gupta | H04W 72/0473 |
| 2019/0342874 | A1* | 11/2019 | Davydov | H04W 72/0413 |
| 2020/0037330 | A1* | 1/2020 | Sharma | H04B 17/318 |
| 2020/0091608 | A1* | 3/2020 | Alpman | H01Q 25/001 |
| 2020/0106674 | A1* | 4/2020 | Van Der Velde | H04B 1/036 |
| 2020/0205062 | A1* | 6/2020 | Azizi | H04W 48/10 |
| 2020/0296187 | A1* | 9/2020 | Sabella | H04L 67/12 |
| 2020/0322023 | A1* | 10/2020 | Kung | H04B 7/0626 |
| 2021/0050999 | A1* | 2/2021 | Huang | H04L 9/14 |
| 2021/0152431 | A1* | 5/2021 | Van Der Velde | |
| | | | | H04W 52/0212 |
| 2021/0168822 | A1* | 6/2021 | Murayama | H04W 88/06 |
| 2021/0243807 | A1* | 8/2021 | Hooli | H04W 72/0453 |
| 2021/0258224 | A1* | 8/2021 | Van Der Velde | H04B 1/036 |
| 2021/0282186 | A1* | 9/2021 | Cherian | H04W 74/0816 |
| 2021/0352689 | A1* | 11/2021 | Jung | H04W 8/24 |
| 2021/0360547 | A1* | 11/2021 | Wentink | H04L 27/2602 |
| 2022/0006882 | A1* | 1/2022 | Sabella | H04L 69/08 |
| 2022/0030627 | A1* | 1/2022 | Hooli | B62D 11/08 |

OTHER PUBLICATIONS

3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 16), 3GPP TS 36.300 V16.1.0, Mar. 2020, 386 pages.

3rd Generation Partnership Project; Technical Specification Group Radio Access Network; NR; NR and NG-RAN Overall Description; Stage 2 (Release 16), 3GPP TS 38.300 V16.1.0, Mar. 2020, 133 pages.

3rd Generation Partnership Project; Technical Specification Group Radio Access Network; NR; Radio Resource Control (RRC) protocol specification (Release 16), 3GPP TS 38.331 V16.0.0, Mar. 2020, 835 pages.

* cited by examiner

| *UEAssistanceInformation* field descriptions |
|---|
| *affectedCarrierFreqList* <br> Indicates a list of NR carrier frequencies that are affected by IDC problem. |
| *affectedCarrierFreqCombList* <br> Indicates a list of NR carrier frequencie combinations that are affected by IDC problems due to Inter-Modulation Distortion and harmonics from NR when configured with UL CA. |
| *interferenceDirection* <br> Indicates the direction of IDC interference. Value nr indicates that only NR is victim of IDC interference, value other indicates that only another radio is victim of IDC interference and value both indicates that both NR and another radio are victims of IDC interference. The other radio refers to either the ISM radio or GNSS (see TR 36.816 [44]). |
| *victimSystemType* <br> Indicate the list of victim system types to which IDC interference is caused from NR when configured with UL CA. Value gps, glonass, bds, galileo and navIC indicates the type of GNSS. Value wlan indicates WLAN and value bluetooth indicates Bluetooth. |

FIGURE 3

| (WiGig)(Ch 1) 706 | (NR-U) 708 | 710 | 712 | (WiGig)(Ch 2) 714 | (NR-U) 716 | 718 | 720 | (WiGig)(Ch 3) 722 | (NR-U) 724 | 726 | 728 | (WiGig)(Ch 4) 730 | (NR-U) 732 | 734 | 736 |
|---|---|---|---|---|---|---|---|---|---|---|---|---|---|---|---|
| f1 | f2 | 2Xf2-f1 | 2X f1-f2 | f1 | f2 | 2Xf2-f1 | 2X f1-f2 | f1 | f2 | 2Xf2-f1 | 2X f1-f2 | f1 | f2 | 2Xf2-f1 | 2X f1-f2 |
| 58.32 | 57 | 55.68 | 59.64 | 60.48 | 57 | 53.52 | 63.96 | 62.64 | 57 | 51.36 | 68.28 | 64.8 | 57 | 49.2 | 72.6 |
| 58.32 | 57.4 | 56.48 | 59.24* | 60.48 | 57.4 | 54.32 | 63.56 | 62.64 | 57.4 | 52.16 | 67.88 | 64.8 | 57.4 | 50 | 72.2 |
| 58.32 | 57.8 | 57.28* | 58.84* | 60.48 | 57.8 | 55.12 | 63.16 | 62.64 | 57.8 | 52.96 | 67.48 | 64.8 | 57.8 | 50.8 | 71.8 |
| 58.32 | 58.2 | 58.08* | 58.44* | 60.48 | 58.2 | 55.92 | 62.76 | 62.64 | 58.2 | 53.76 | 67.08 | 64.8 | 58.2 | 51.6 | 71.4 |
| 58.32 | 58.6 | 58.88* | 58.04* | 60.48 | 58.6 | 56.72 | 62.36 | 62.64 | 58.6 | 54.56 | 66.68 | 64.8 | 58.6 | 52.4 | 71 |
| 58.32 | 59 | 59.68 | 57.64* | 60.48 | 59 | 57.52 | 61.96 | 62.64 | 59 | 55.36 | 66.28 | 64.8 | 59 | 53.2 | 70.6 |
| 58.32 | 59.4 | 60.48 | 57.24* | 60.48 | 59.4 | 58.32 | 61.56* | 62.64 | 59.4 | 56.16 | 65.88 | 64.8 | 59.4 | 54 | 70.2 |
| 58.32 | 59.8 | 61.28 | 56.84 | 60.48 | 59.8 | 59.12 | 61.16* | 62.64 | 59.8 | 56.96 | 65.48 | 64.8 | 59.8 | 54.8 | 69.8 |
| 58.32 | 60.2 | 62.08 | 56.44 | 60.48 | 60.2 | 59.92* | 60.76* | 62.64 | 60.2 | 57.76 | 65.08 | 64.8 | 60.2 | 55.6 | 69.4 |
| 58.32 | 60.6 | 62.88 | 56.04 | 60.48 | 60.6 | 60.72* | 60.36* | 62.64 | 60.6 | 58.56 | 64.68 | 64.8 | 60.6 | 56.4 | 69 |
| 58.32 | 61 | 63.68 | 55.64 | 60.48 | 61 | 61.52* | 59.96* | 62.64 | 61 | 59.36 | 64.28 | 64.8 | 61 | 57.2 | 68.6 |
| 58.32 | 61.4 | 64.48 | 55.24 | 60.48 | 61.4 | 62.32 | 59.56* | 62.64 | 61.4 | 60.16 | 63.88 | 64.8 | 61.4 | 58 | 68.2 |
| 58.32 | 61.8 | 65.28 | 54.84 | 60.48 | 61.8 | 63.12 | 59.16 | 62.64 | 61.8 | 60.96 | 63.48* | 64.8 | 61.8 | 58.8 | 67.8 |
| 58.32 | 62.2 | 66.08 | 54.44 | 60.48 | 62.2 | 63.92 | 58.76 | 62.64 | 62.2 | 61.76* | 63.08* | 64.8 | 62.2 | 59.6 | 67.4 |
| 58.32 | 62.6 | 66.88 | 54.04 | 60.48 | 62.6 | 64.72 | 58.36 | 62.64 | 62.6 | 62.56* | 62.68* | 64.8 | 62.6 | 60.4 | 67 |
| 58.32 | 63 | 67.68 | 53.64 | 60.48 | 63 | 65.52 | 57.96 | 62.64 | 63 | 63.36* | 62.28* | 64.8 | 63 | 61.2 | 66.6 |
| 58.32 | 63.4 | 68.48 | 53.24 | 60.48 | 63.4 | 66.32 | 57.56 | 62.64 | 63.4 | 64.16 | 61.88* | 64.8 | 63.4 | 62 | 66.2 |
| 58.32 | 63.8 | 69.28 | 52.84 | 60.48 | 63.8 | 67.12 | 57.16 | 62.64 | 63.8 | 64.96 | 61.48 | 64.8 | 63.8 | 62.8 | 65.8* |
| 58.32 | 64.2 | 70.08 | 52.44 | 60.48 | 64.2 | 67.92 | 56.76 | 62.64 | 64.2 | 65.76 | 61.08 | 64.8 | 64.2 | 63.6 | 65.4* |
| 58.32 | 64.6 | 70.88 | 52.04 | 60.48 | 64.6 | 68.72 | 56.36 | 62.64 | 64.6 | 66.56 | 60.68 | 64.8 | 64.6 | 64.4* | 65* |
| 58.32 | 65 | 71.68 | 51.64 | 60.48 | 65 | 69.52 | 55.96 | 62.64 | 65 | 67.36 | 60.28 | 64.8 | 65 | 65.2* | 64.6* |
| 58.32 | 65.4 | 72.48 | 51.24 | 60.48 | 65.4 | 70.32 | 55.56 | 62.64 | 65.4 | 68.16 | 59.88 | 64.8 | 65.4 | 66 | 64.2* |
| 58.32 | 65.8 | 73.28 | 50.84 | 60.48 | 65.8 | 71.12 | 55.16 | 62.64 | 65.8 | 68.96 | 59.48 | 64.8 | 65.8 | 66.8 | 63.8* |

FIGURE 7

```
UEAssistanceInformation-v1610-IEs ::= SEQUENCE{
    idc-Assistance-r16              IDC-Assistance-r16              OPTIONAL,
    drx-Prefernce-r16               DRXPreference-r16               OPTIONAL,
    maxBW-Preference-r16            MaxBW-Preference-r16            OPTIONAL,
    maxCC-Preference-r16            MaxCC-Preference-r16            OPTIONAL,
    maxMIMO-LayerPreference-r16     MaxMIMO-LayerPreference-r16     OPTIONAL,
    maxSchedulingOffsetPreference-r16  maxSchedulingOffsetPreference-r16  OPTIONAL,
    releasePreference-r16           ReleasePreference-r16           OPTIONAL,
    sl-UE-AssistanceInforamtionNR-r16  SL-UE-AssistanceInforamtionNR-r16  OPTIONAL,
    referenceTimeInfoPreference-r16  BOOLEAN                        OPTIONAL,
    nonCriticalExtension             UEAssistanceInformation-v1700-IEs  OPTIONAL
}

UEAssistanceInformation-v1700-IEs ::= SEQUENCE{
    idc-Assistance-r17      IDC-Assistance-r17 OPTIONAL,
    ...
}

IDC-Assistance-r17          ::= SEQUENCE{
    affectedCarrierFreqqCombList-r17  AffectedCarrierFreqCombList-r17  OPTIONAL,
}

AffectedCarrierFreqCombList-r17    ::= SEQUENCE {
    affectedCarrierFreqComb-r17    SEQUENCE (SIZE (2 .. maxNrofServingCells)) of ARFCN-ValueNR  OPTIONAL,
    victimSystemType-r17           VictimSystemType-r17            OPTIONAL,
    ...
}

VictimSystemType-r17           ::= SEQUENCE {
    wigig-r17        ENUMERATED  {true}         OPTIONAL,
    ...
}
```

FIGURE 8

| FIGURE 12A |
|---|
| FIGURE 12B |
| FIGURE 12C |
| FIGURE 12D |

IN-DEVICE COEXISTENCE FOR NEW RADIO

FIELD

The present application relates to wireless communications methods and apparatus, and more particularly for method and apparatus for reducing or avoiding in-device coexistence (IDC) problems, e.g., in the frequency range of 52.6 GHz to 71 GHz.

BACKGROUND

A Release-17 Study Item (Rel-17 SI) on extending New Radio (NR) operation to the frequency range of 52.6 GHz-71 GHz has been in progress since May 2020. This SI targets utilization of the very wide unlicensed and licensed spectrum bandwidths in this frequency range.

The SI objectives include: i) the study of required changes in NR using existing downlink/uplink (DL/UL) NR waveform to support operation between 52.6 GHz and 71 GHz including the study of applicable numerology subcarrier spacing (SCS), channel bandwidth (BW) including maximum BW, and their impact to frequency range 2 (FR2) physical layer design to support system functionality considering practical radio frequency (RF) impairments, and ii) identify potential critical problems to physical signal/channels, if any.

The frequency range of 52.6 GHz-71 GHz is also used by other radio access technologies such as 802.11ad and 802.11ay.

There is a separate Rel-17 work item (WI) on Further enhanced Multiple Input Multiple Output (FeMIMO) that covers multi-panel (MP) user equipment (UE) enhancements. A UE panel comprises a collection of transceiver units (TXRUs) that is able to generate one analog beam (one beam may correspond to two antenna ports if dual-polarized array is used). UE panels can constitute the same as well as different numbers of antenna elements and ports, number of beams and Effective Isotropic Radiated Power (EIRP). For facilitating fast uplink panel selection, the following use cases are assumed: Maximum Permissible Exposure (MPE) mitigation, UE power saving, UL interference management, support different configurations across panels and UL multi-Total Radiated Power (mTRP).

Both Long Term Evolution (LTE) and New Radio (NR) support in-device coexistence (IDC) mechanisms for a UE equipped with multiple radio transceivers that are physically proximate and operate on adjacent frequencies or sub-harmonic frequencies. The interference power coming from a transmitter of the collocated radio may be much higher than the actual received power level of the desired signal for a receiver, even after filtering. The UE invokes IDC reporting to its serving base station via dedicated radio resource control (RRC) signaling when it cannot solve the IDC issue by itself. For example, a Rel-16 NR UE can report IDC issues with Wireless Local Area Network (WLAN), Bluetooth, or Global Navigation Satellite System (GNSS) radios such as Global Positioning System (GPS).

In LTE, when notified of IDC problems, the eNB can choose to apply a Frequency Division Multiplexing (FDM) solution or a Time Division Multiplexing (TDM) solution, as shown in drawing 100 of FIG. 1. Drawing 100 of FIG. 1 shows LTE IDC phases. In step 102 the UE detects start of IDC interference and LTE IDC phase 1 103 begins. In step 104 the UE initiates the transmission of an IDC indication to an eNB and LTE IDC phase 2 105 starts. In step 106 the eNB provides a solution that solved the IDC problem and LTE IDC phase 3 107 starts.

The basic concept of a FDM solution is to move the LTE signal away from the Industrial Scientific Medical (ISM) band by, e.g., performing inter-frequency handover within E-UTRAN, removing SCells from the set of serving cells or de-activation of affected SCells, or in the case of uplink CA operation, allocating uplink Physical Resource Block (PRB) resources on Component Carrier(s) (CC(s)) whose inter-modulation distortion and harmonics does not fall into the frequency range of the victim system receiver. The basic concept of a TDM solution is to ensure that transmission of a radio signal does not coincided with reception of another radio signal. LTE Discontinuous Reception (DRX) mechanism is used to provide TDM patterns (i.e. periods during which the LTE UE may be scheduled or is not scheduled) to resolve the IDC issues. DRX based TDM solution should be used in a predictable way, i.e., the eNB should ensure a predictable pattern of unscheduled periods by means of, e.g., DRX mechanism or de-activation of affected SCells.

In the case of NR, the FDM solution from LTE is adopted. The NR UE indicates the affected frequencies to the network, which can then take further action to alleviate the solution. For the frequencies on which a serving cell of serving cells is configured that is activated, IDC problems consist of interference issues that the UE can solve by itself, during either active data exchange or upcoming data activity which is expected in up to a few hundred milliseconds. The UEAssistanceInformation RRC message is used or the indication of NR UE assistance information to the network, including IDC issues. Drawing 200 of FIG. 2 shows the UEAssistanceInformation RRC message format. FIG. 3 provides UEAssistanceInformation field descriptions in table 300.

RF IDC challenges with two transceivers WI-Gig and 60 GHz New Radio-Unlicensed (NR-U) will now be described. A typical UE architecture containing a WLAN WI-Gig module and a 60 GHz NR-U transceiver will have independent antenna arrays. The antenna isolation can be as low as 10 dB or higher depending on beam forming. The lower the isolation, the greater the inter-system interference. Some architectures will have two sets of antenna arrays, one for vertical polarization and another one for horizontal polarization (dual polarization). Antenna arrays can have 64-256 antenna elements. For 17-27 dBm power output, the module can have 16-64 Power Amplifiers (PAs). Spec can be 1 W/PA element.

FIG. 4 includes drawing 400 which illustrates a typical UE architecture block diagram 402 for a transmit/receive (TR) Block and an exploded view drawing 402' of the TR block 402. The TR block 402 includes digital to analog converters (DACs) 407, mixers 407, a transmit phase array 404, an analog to digital converter (ADC) 409, a mixer 411, and a receive phase array 406. The transmit phase array 404 includes, an active and passive power splitter 408, phase shifters 410, power amplifiers 412 and antenna array 414 including a plurality of antennas 416, and a serial peripheral interface (SPI) controller 418 for controlling the PAs 412 and the phase shifters 410. The receive phase array 406 includes antenna array 426 including a plurality of antennas 428, low noise amplifiers (LNAs) 424, phase shifters 422, an active and passive combiner 420, and an SPI controller 430 for controlling the LNAs 424 and the phase shifters 422. Antenna isolation will be established between antenna phase arrays.

FIG. 5 illustrates an integrated phase array transceiver 500. Integrated phase array transceiver 500 includes assembly of components 501, antenna submodule controller 502 and external synthesizer 508 coupled together as shown. Assembly of components 501 includes a control and monitor interface 504, a beam control interface 506, a local oscillator (LO) distribution/doubler 510, upconverters 512, 514, downconverters 516, 518, a 1:16 passive combiner/splitter 520, and sixteen TR blocks (522, 524, 526, 528, 530, 532, 534, 536, 538, 540, 542, 544, 546, 548, 550, 552).

IDC interference can vary depending on antenna array configuration, number of PA elements per module and polarization techniques, but if the channelization assignment between NR-U and Wi-Gig are in close proximity, this interference might not be mitigated based on the above techniques, hence a solution to Rel-16 NR is needed for 60 GHz for the UE to be able to report IDC issues to the gNB.

Another RF challenge for co-existence between WiGig and 60 GHz NR-U is third order intermodulation (IM) or harmonic interference. Although synchronized networks can avoid this condition, it is difficult in some cases to have these networks synchronized.

In the scenario of FIGS. 6 and 7, a few assumptions are made for NR-U, min channel bandwidth is 400 MHz. This will help in identifying the channelization.

FIG. 6 is a drawing 600 including a first table 602 illustrating 60 GHz WiFi (Wi-Gig) channelization for 802.11ad and 802.11ay and a second table 604 illustrating 60 GHz NR-U channelization. First column 606 of table 602 includes channel numbers; second column 608 of table 602 includes center frequency (in GHz) for each channel; third column 610 of table 602 includes Minimum (Min) frequency (in GHz) for each channel; fourth column 612 of table 602 includes Maximum (Max) frequency (in GHz) for each channel; and fifth column 614 of table 602 includes bandwidth (BW) (in GHz) for each channel.

First column 656 of table 604 includes channel numbers; second column 658 of table 604 includes center frequency (in GHz) for each channel; third column 660 of table 604 includes Minimum (Min) frequency (in GHz) for each channel; fourth column 662 of table 604 includes Maximum (Max) frequency (in GHz) for each channel; and fifth column 664 of table 604 includes bandwidth (BW) (in GHz) for each channel.

FIG. 7 includes a table 700 including various combinations of WiGig channels and NR-U channels of FIG. 6 and further illustrating NR harmonics falling in the Wi-Gig band as a result of a third order inter-modulation distortion (IMD) mechanism giving rise to inter-system interference.

Column 706 includes frequency 1 (f1) values, which is the center frequency for channel 1 WiGig. Column 708 includes frequency 2 (f2) values, which are the center frequencies corresponding to various NR-U channels (Ch 1-Ch 23). Column 710 includes values for 2×f2−f1. Column 712 includes values for 2×f1−f2.

Column 714 includes frequency 1 (f1) values, which is the center frequency for channel 2 WiGig. Column 716 includes frequency 2 (f2) values, which are the center frequencies corresponding to various NR-U channels (Ch 1-Ch 23). Column 718 includes values for 2×f2−f1. Column 720 includes values for 2×f1−f2.

Column 722 includes frequency 1 (f1) values, which is the center frequency for channel 3 WiGig. Column 724 includes frequency 2 (f2) values, which are the center frequencies corresponding to various NR-U channels (Ch 1-Ch 23). Column 726 includes values for 2×f2−f1. Column 728 includes values for 2×f1−f2.

Column 730 includes frequency 1 (f1) values, which is the center frequency for channel 4 WiGig. Column 732 includes frequency 2 (f2) values, which are the center frequencies corresponding to various NR-U channels (Ch 1-Ch 23). Column 734 includes values for 2×f2−f1. Column 736 includes values for 2×f1−f2.

Items indicated in table 700 with an "*" are NR harmonics falling in the Wi-Gig band as a result of a third order intermodulation distortion (IMD) mechanism giving rise to inter-system interference.

A NR UE equipped with two transceivers in the 60 GHz band, such as IEEE 802.11ad/ay radios and NR operating in 52.6-71 GHz, may perceive IDC issues due to adjacent frequencies or sub-harmonic frequencies. NR does not currently support reporting of IDC issues with 802.11 ad/ay (WiGig). Based on the above discussion there is a need for new methods and apparatus to provide solutions with regard to IDC issues for this frequency band.

SUMMARY

Various method and apparatus, in accordance with the present invention, are directed to features to enhance new radio in-device coexistence (NR IDC) mechanisms in the frequency range 52.6 GHz-71 GHz. Various exemplary method and apparatus, in accordance with the present invention, are well suited for using in both a phone form-factor user equipment (UE) and an Integrated Access Backhaul (IAB) node with UE functionality.

A communications device, e.g. a UE with two transceivers, e.g. a WiGig transceiver and a 60 GHz NR-U transceiver, which detects an in-device coexistence (IDC) problem which it can not solve on its own, generates and sends a message to a network control device. The network control device, e.g. a gNB, receives the message from the communications device, e.g. UE, indicating that the communications device is experiencing an in-device coexistence (IDC) problem, e.g. in the 52.6 GHz-71 GHz frequency range with respect to NR-U and WiGig. The message is one of: i) an IDC assistance message indicating that the victim system is Wi-Gig or ii) an antenna panel switch message requesting that the network control device instruct the communications device to change the antenna panel that it uses for uplink NR signaling. In some embodiments, the communications device further communicates information, e.g., communications device preferred frequency or frequencies to use, communications device power amplifier (PA) characteristic information, and/or communications device preferred antenna panel or panels to switch to, to assist the network control device in making a decision. The network control device generates and sends a response message to the communications device including: a selected new frequency to be used by the communications device for uplink NR signaling or a selected different antenna panel to be used by the communications device for uplink NR signaling. The communications device implements the change in accordance with the response message, e.g., switching to a new NR uplink frequency or switching to a different antenna panel for uplink NR signaling, thus reducing or avoiding the previously detected IDC problem. Changing the frequency used if a frequency solution to the detected IDC problem. Changing the antenna panel is a spatial solution to the detected IDC problem.

An exemplary communications method, in accordance with some embodiments, comprises: operating a network control device, e.g. gNB, to monitor for messages; and receiving, at the network control device, a first in-device coexistence (IDC) assistance message from a first communications device, e.g., first UE, that detected an in-device coexistence problem, the first IDC assistance message indicating a wigig victim type.

An exemplary communications method, in accordance with some embodiments, comprises: operating a network control device, e.g. gNB, to monitor for messages; and receiving, at the network control device (e.g., gNB), a panel switch message from a communications device, e.g., UE, that supports space division multiplexing via the use of multiple antenna panels, said panel switch message including: i) a request that the network control device switch the antenna panel being used, by the communications device, for uplink communications between the communications device and the network control device or ii) a notification that the communications device is switching the antenna panel being used, by the communications device, for uplink communications between the communications device and the network control device.

While various features discussed in the summary are used in some embodiments it should be appreciated that not all features are required or necessary for all embodiments and the mention of features in the summary should in no way be interpreted as implying that the feature is necessary or critical for all embodiments.

Numerous aspects, features, and variations on the above described methods and apparatus are discussed in the detailed description which follows.

BRIEF DESCRIPTION OF THE FIGURES

FIG. 3 provides UEAssistanceInformation field descriptions corresponding the Release-16 NR UEAssistanceInformation RRC message format shown in FIG. 2.

FIG. 7 includes a table including various combinations of WiFi channels and NR-U channels of FIG. 6 and further illustrating NR harmonics falling in the Wi-Gig band as a result of a third order inter-modulation distortion (IMD) mechanism giving rise to inter-system interference.

FIG. 8 is a drawing illustrating format of an exemplary novel UEAssistanceInformation message in accordance with an exemplary embodiment.

DETAILED DESCRIPTION

An exemplary embodiment, in accordance with the present invention, introduces the changes necessary on higher level signaling (UEAssistanceInformation), e.g., includes a novel UEAssistanceInformation message, to report IDC issues with WiGig to the gNB in Rel-17. The gNB may, and sometimes does, respond to the UE by moving NR operation to a new frequency using existing or new mechanisms. FIG. 8 is a drawing 800 illustrating format of an exemplary novel UEAssistanceInformation message. UEAssistanceInformation message includes new information 802 for reporting with respect to the 52.6 GHz-71 GHz and include new victim type wigig 804.

In a further aspect of some embodiments, the UE may, and sometimes does, also indicate preferred new frequencies of operation, e.g. for its NR PSCell/SCells. The UE may, and sometimes does, also provide characteristics of its power amplifier(s) (e.g., power coefficient and harmonic frequencies) to assist a network control device, e.g. a gNB, in determining a new NR operating frequency. In some embodiments a list of preferred new frequencies of operation and/or characteristics of the power amplifier(s) are further included in the UE Assistance information message which reports IDC. In some other embodiments a list of preferred new frequencies of operation and/or characteristics of the power amplifier(s) are reported separately, e.g., in one or more additional messages, to the network control device, e.g. gNB, in addition to the UE Assistance information message which reports IDC, e.g., as supplement information to be used in selecting the new frequencies.

Figure 1:
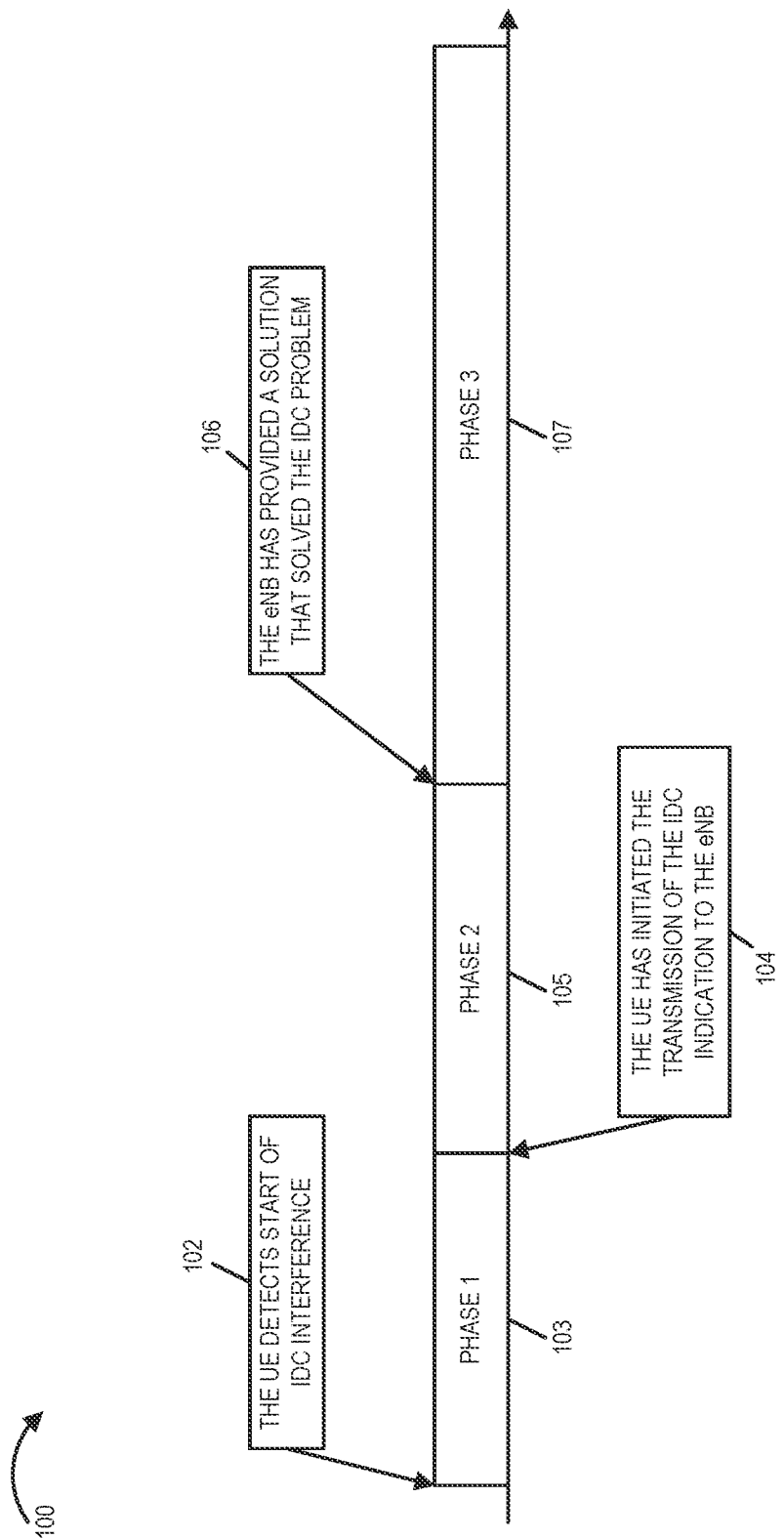
FIG. 1 illustrates that in LTE, when notified of IDC problems, the eNB can choose to apply a Frequency Division Multiplexing (FDM) solution or a Time Division Multiplexing (TDM) solution.
Figure 2:
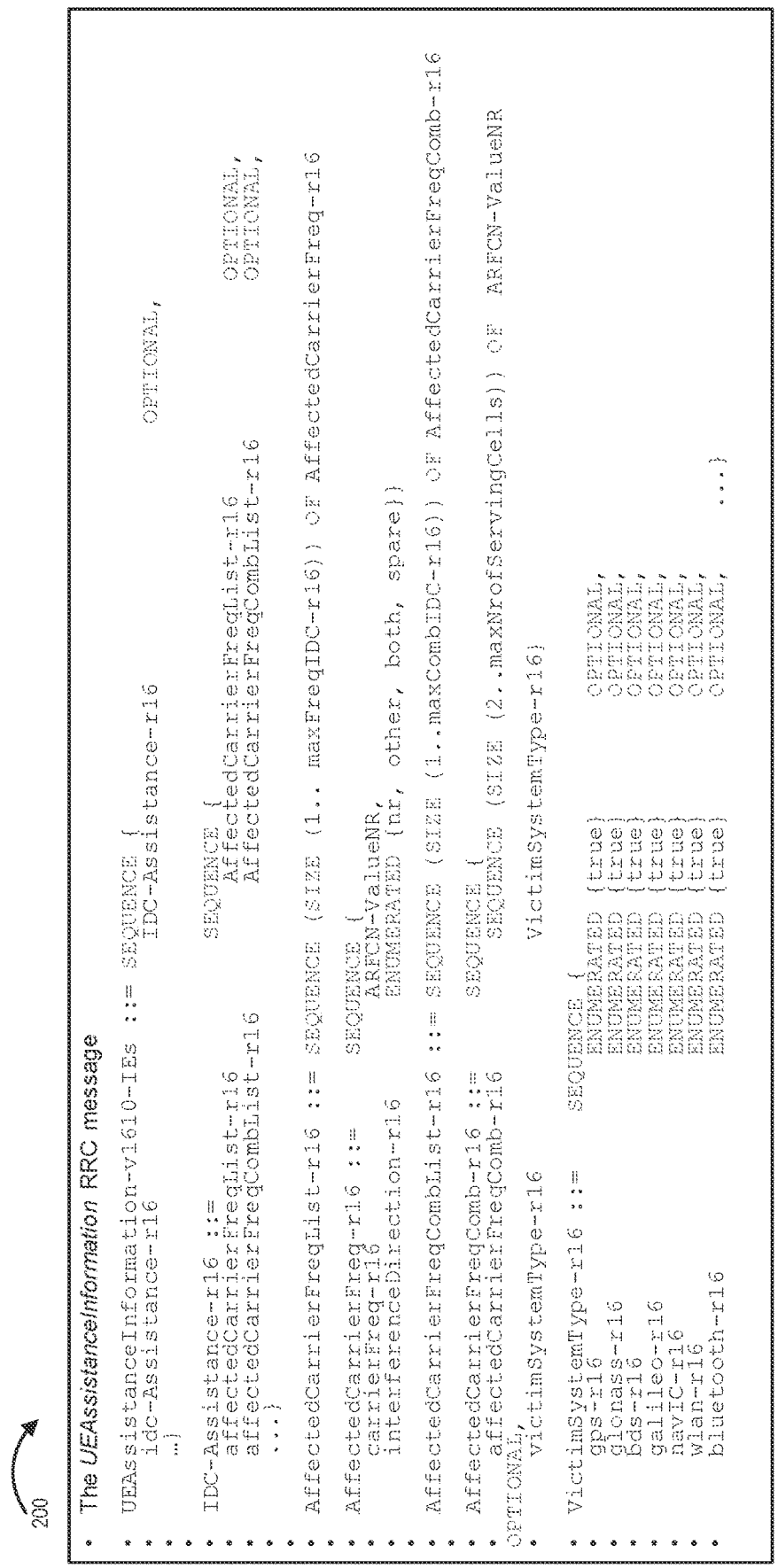
FIG. 2 shows the Release-16 NR UEAssistanceInformation RRC message format.
Figure 4:
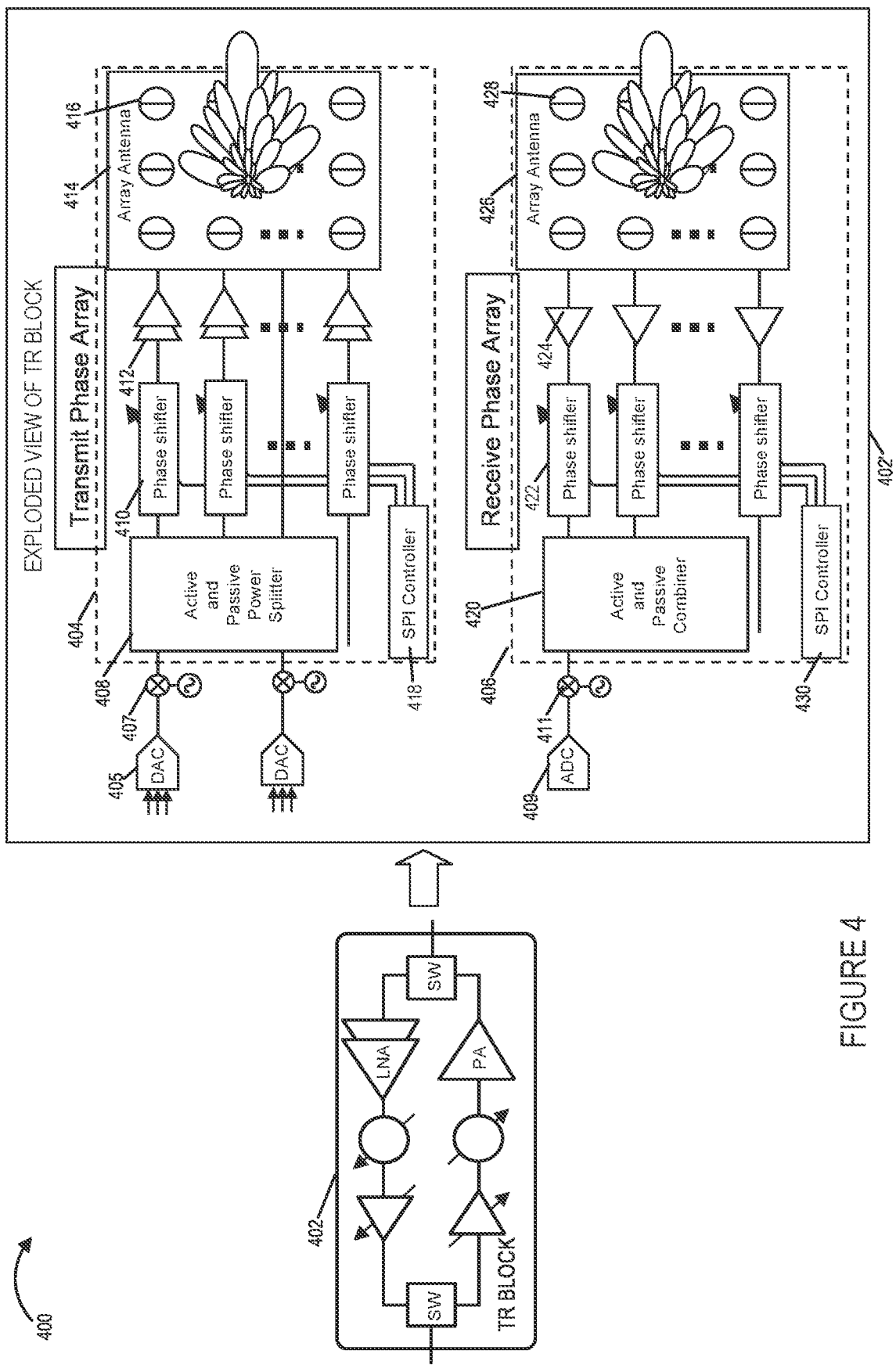
FIG. 4 illustrates a typical UE architecture block diagram for a TR Block.
Figure 5:
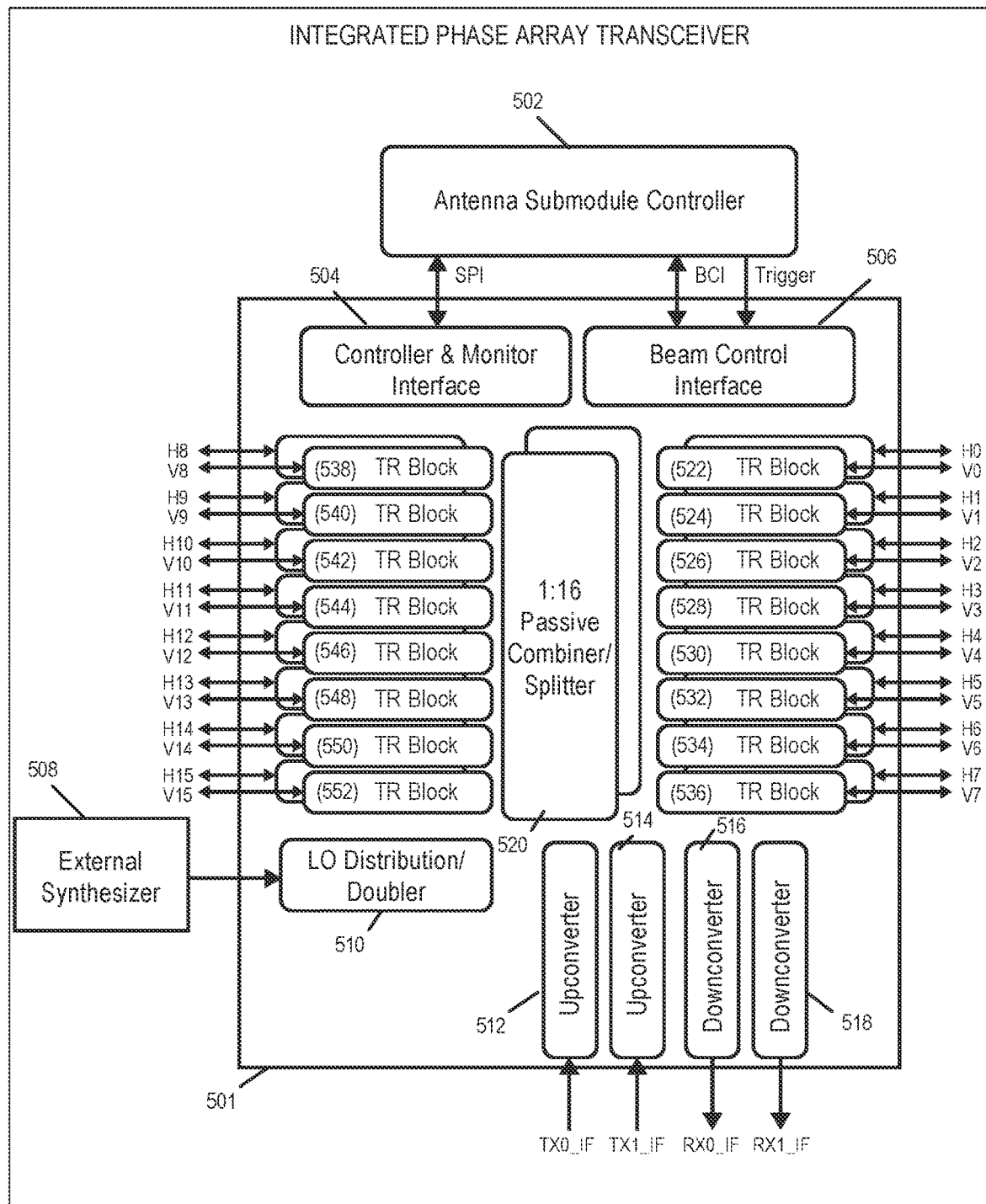
FIG. 5 illustrates an integrated phase array transceiver.
Figure 6:
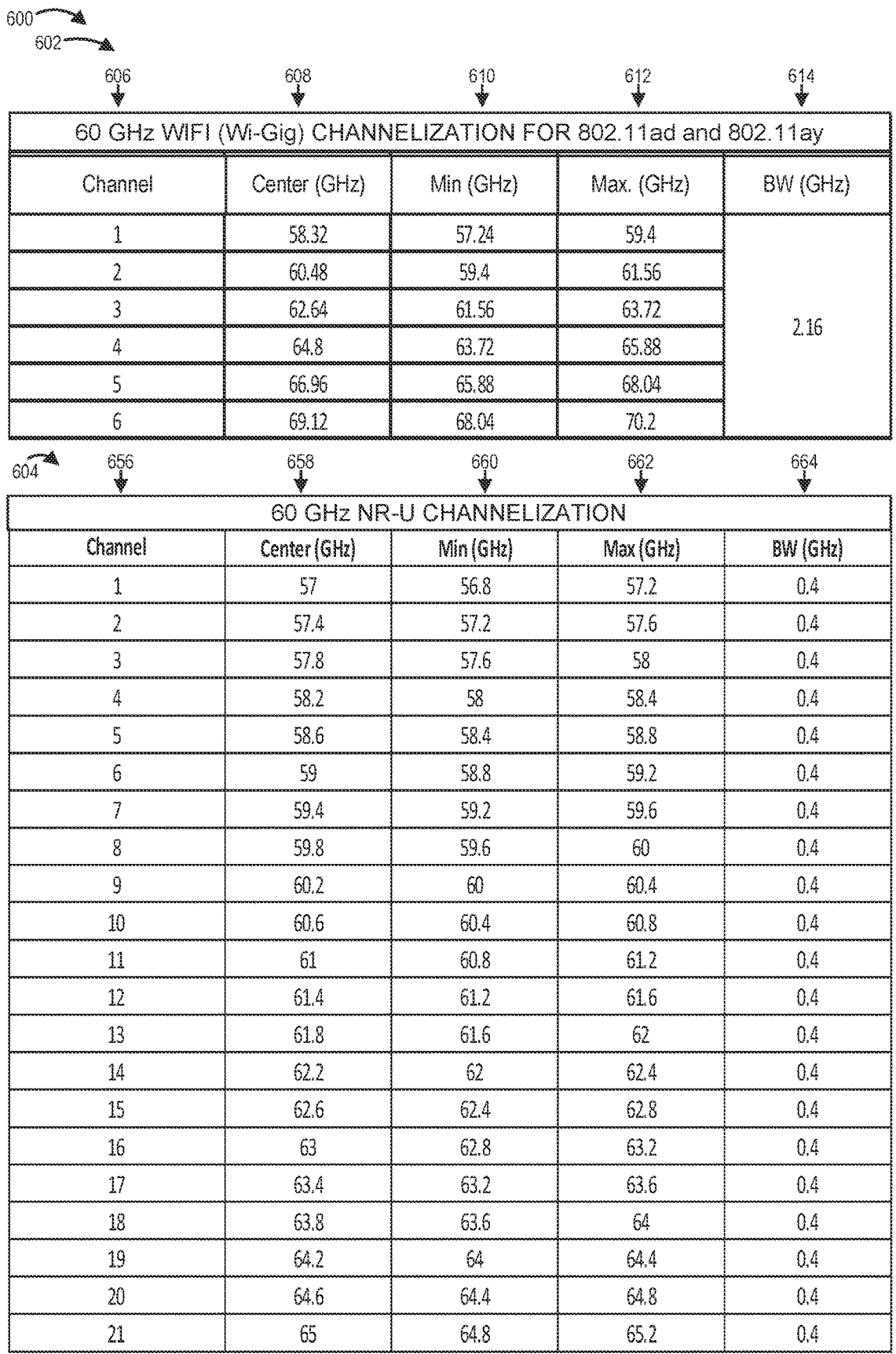
FIG. 6 includes a first table illustrating WiFi channelization for 802.11ad and 802.11ay (WiGig) and a second table illustrating channelization for NR-U.
Figure 9:
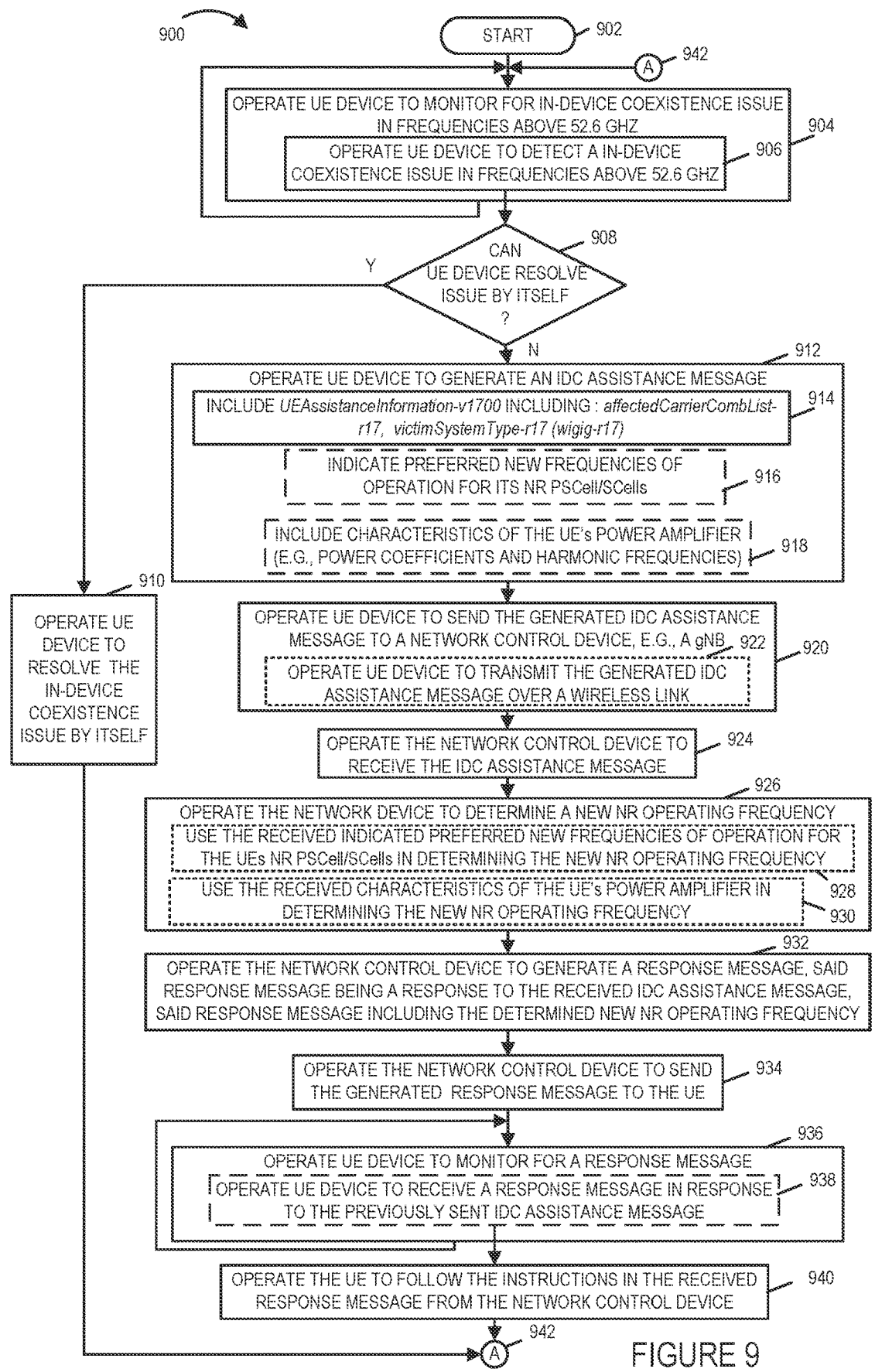
FIG. 9 is a drawing of a flowchart of an exemplary method of operating a user equipment (UE), in which the UE detects an in-device coexistence (IDC) problem, generates and sends an IDC assistance message to a network control device, and receives a response message, said response message commanding the UE to change a frequency used for uplink in NR spectrum, in accordance with an exemplary embodiment.

FIG. 9 is a drawing of a flowchart 900 of an exemplary method of operating a user equipment (UE) device in accordance with an exemplary embodiment. Operation starts in step 902 in which the UE is powered on and initialized. Operation proceeds from start step 902 to step 904. In step 904 the UE monitors for an in-device coexistence issues in frequencies above 52.6 GHz. Step may, and sometimes does, include step 906, in which the UE detects an in-device coexistence issue in frequencies above 52.6 GHz. Operation proceeds from step 906 to step 908.

In step 908 the UE determines if the UE can resolve the IDC issue by itself. If the UE determines that it can resolve the IDC issue by itself, then operation proceeds from step 908 to step 910, in which the UE performs operations to resolve the IDC issue by itself. However, if the UE determines that it cannot resolve the IDC issue by itself, then operation proceeds from step 908 to step 912.

In step 912 the UE generates and IDC assistance message. Step 912 includes step 914, and may, and sometimes does, include one or both of steps 916 and 918. In step 914 the UE device includes UE assistance information including: an affected carrier list and victim system type information identifying Wi-Gig (alternatively known as 60 GHz WiFi), e.g. UEAssistanceInformation-v1700 including: affectedCarrierCombList-r17, victimSystemType-r17 (wigig-r17), in the IDC assistance message. In step 916 the UE includes, in the IDC assistance message, information indicating preferred new frequencies of operation for its New Radio Primary Secondary Cell Group (SCG) Cell/Secondary Cells (NR PSCell/SCells). In step 918 the UE includes, in the IDC assistance message, characteristics of the UE's power amplifier, e.g. power coefficients and harmonic frequencies. Operation proceeds from step 912 to step 920.

In step 920 the UE sends the generated IDC assistance message to a network control device, e.g. a gNB. Step 920 includes step 922 in which the UE transmits the generated message over a wireless link. Operation proceeds from step 920 to step 924, in which the network control device, e.g. gNB, receives the IDC assistance message and recovers the communicated information. Operation proceeds from step 924 to step 926. In step 936 the network control device, e.g. gNB, determines a new NR operating frequency. In some embodiments, step 926 includes one or both of steps 928 and 930. In step 928 the network control device, e.g. gNB, uses the received indicated preferred new frequencies of operation for the UE's NR PSCell/SCells, in determining the new NR operating frequency to be used by UE. In step 930 the network control device, e.g. gNB, uses the received characteristics of the UE's power amplifier in determining the new NR operating frequency to be used by UE. Operation proceeds from step 932 to step 934.

In step 934 the network control device, e.g. gNB, sends the generated response message to the UE. Operation proceeds from step 934 to step 936. In step 936 the UE device monitors for a response message. Step 936 may, and sometimes does, include step 938, in which the UE device receives a response message to the previously sent IDC assistance message, said response message including instructions, e.g. information indicating the new frequency to be used by the UE with regard to NR uplink signaling, and information indicating when the switch is to occur. Operation proceeds from step 938 to step 940. In step 940 the UE device follows the instructions in the received response message from the network control device, e.g. the UE switches to the indicated new frequency for NR operation at the indicated time.

Operation proceeds from step 910 or step 940, via connecting node A 942, to the input of step 904.

Figure 10:
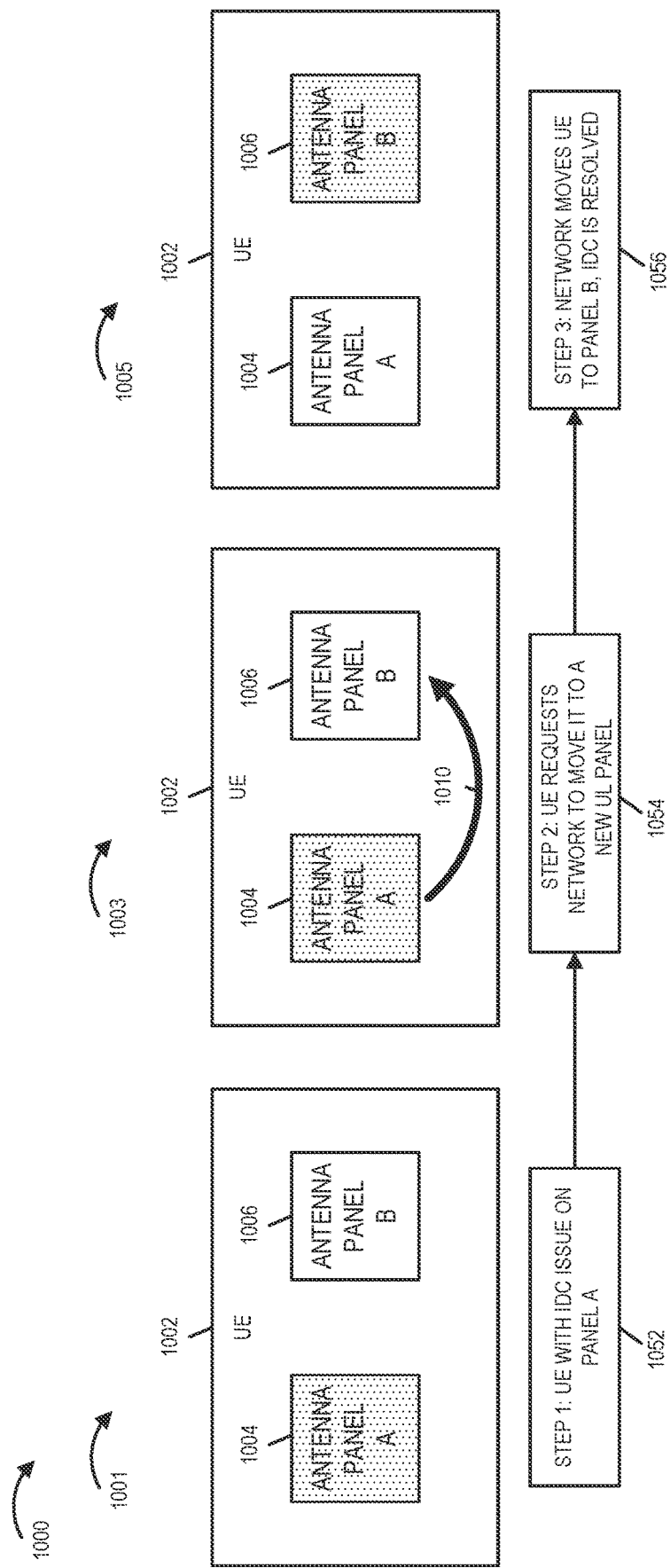
FIG. 10 illustrates an example in which a multi-antenna panel user equipment (UE) detects an IDC problem, sends a panel change request to a network control device, receives a response instructing the UE to change the antenna panel, and changes the antenna panel in accordance with the instructions causing the IDC problem to be reduce or eliminated, in accordance with an exemplary embodiment.

A second exemplary embodiment includes a new mechanism for combating IDC for a multi-panel UE. The UE request the network to move its transmissions/receptions to one or more new UL panels. This is a space division multiplexing (SDM) approach, in addition to the time division multiplexing (TDM) and frequency division multiplexing (FDM) techniques supported in LTE and NR. The UE may, and sometimes does, further provide the suggested panel IDs of the new panels. The network responds by initiating activation of a new UL panel(s). The net effect is to resolve IDC through increased antenna isolation. An example with a two-panel UE 1002, which includes antenna panel A 1004 and antenna panel B 1006, is shown in drawing 1000 of FIG. 10. Drawing 1001 illustrates a first step 1052 in which the UE 1002, which is using panel A 1004, as indicated by dotted shading, detects an in-device coexistence (IDC) issue with regard to using panel A 1004. Drawing 1003 illustrates a second step 1054 in which the UE 1002 requests the network to move it to a new UL panel, as indicated by arrow 1010. Drawing 1005 illustrates a third step 1056 in which the network moves the UE 1002 to panel B 1006, as indicated by dotted shading of panel B 1006, and the IDC issue is resolved.

Figure 11:
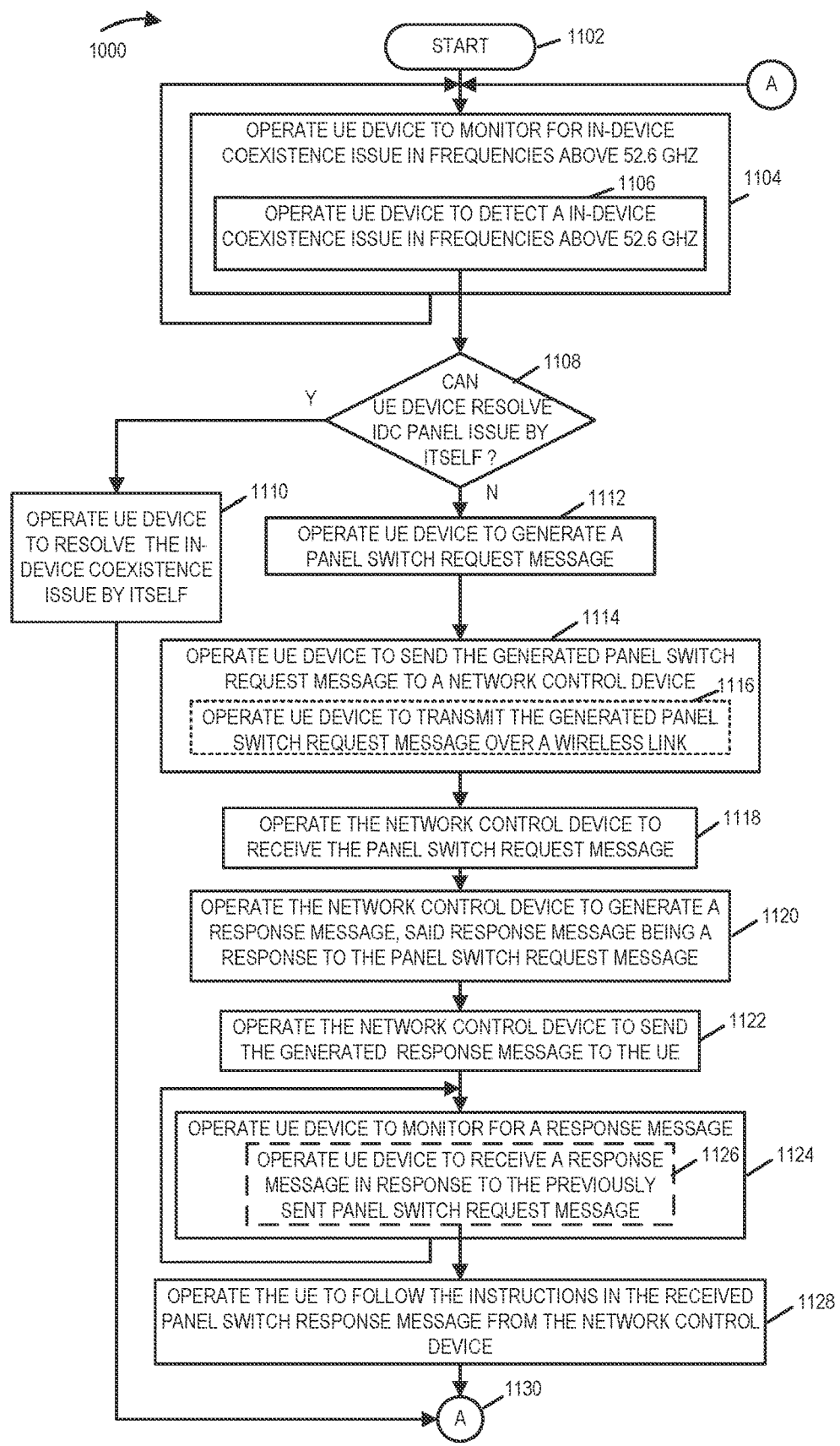
FIG. 11 a flowchart of an exemplary method of operating a multi-panel user equipment (UE), in which an antenna panel being used by the UE is changed in response to a detected IDC problem to reduce or eliminate the IDC problem, in accordance with an exemplary embodiment.

FIG. 11 a flowchart 1100 of an exemplary method of operating a multi-panel UE in accordance with an exemplary embodiment. In step 1102 the UE is powered on and initialized. Operation proceeds from start step 1102 to step 1104. In step 1104, which is performed repetitively on an ongoing basis, the UE monitors for an in-device coexistence issue in the frequencies above 52.6 GHz. Step 1104, may, and sometime does include step 1106, in which the UE detects an in-device coexistence (IDC) issue in frequencies above 52.6 GHz. Operation proceeds from step 1106 to step 1108.

In step 1108 the UE determines if the UE can resolve the IDC panel issue by itself. If the UE determines that it can resolve the IDC panel issue by itself, then operation proceeds from step 1108 to step 1110, in which the UE performs one or more operation to resolve the panel IDC issue by itself. In some embodiments, step 1110 includes operating the UE to switch the antenna panel used for Wi-Gig to another antenna panel.

However, if the UE determines that it cannot resolve the panel IDC issue by itself, then operation proceeds from step 1108 to step 1112, in which the UE generates a panel switch request message. Operation proceeds from step 1112 to step 1114.

In step 1114 the UE device sends the generated panel switch request message to a network control device, e.g., a gNB. In some embodiments, step 1114 includes step 1116 in which the UE transmits the generated panel switch request message over a wireless link. Operation proceeds from step 1114 to step 1118.

In step 1118 the network control device, e.g. gNB, receives the panel switch request message and recovers the communicated information, e.g. a request for a panel switch and optionally information indicated a UE preferred panel or preferred set of panels to be used. Operation proceeds from step 1118 to step 1120. In step 1120 the network device generates a response message, said response message being a response to the panel switch request message. The response message includes, e.g., information identifying a new panel or new set of panels to be used by the UE and optionally information, indicating when the panel switch is to be implemented by the UE. Operation proceeds from step 1120 to step 1122. In step 1122 the network control device sends the generated response message to the UE. Operation proceeds from step 1122 to step 1124.

In step 1124 the UE device monitors for a response message. Step 1124 may, and sometimes does, include step 1126, in which the UE device receives a response message in response to the previously sent panel switch request message and recovers the information communicated in the response message, e.g. information indicating that the switch request is being granted and instructions for implementing the switch including information identifying the new panel or panels to be used and information identifying when to implement the switch. Operation proceeds from step 1126 to step 1128.

In step 1128 the UE device follows the instructions in the received panel switch response message from the network control device, e.g. switching to the new panel or panels at the appropriate time. Subsequently, the new antenna panel or panels are used by the UE for uplink NR signaling. Operation proceeds from step 1110 or 1128, via connecting node A 1130, to step 1104.

Figure 12A:
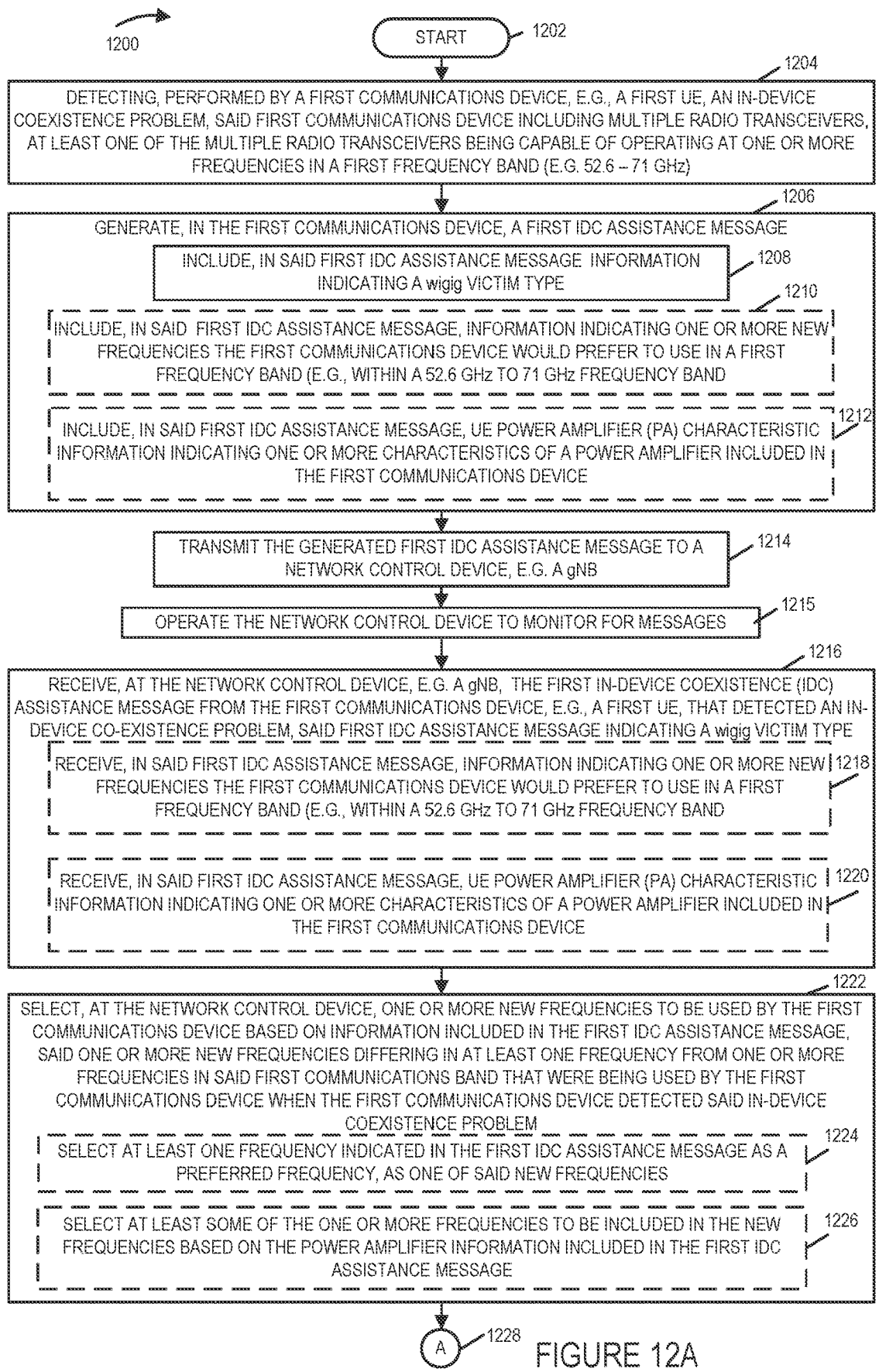
FIG. 12A is a first part of a flowchart of an exemplary method of operating a communications system in accordance with an exemplary embodiment.
Figure 12B:
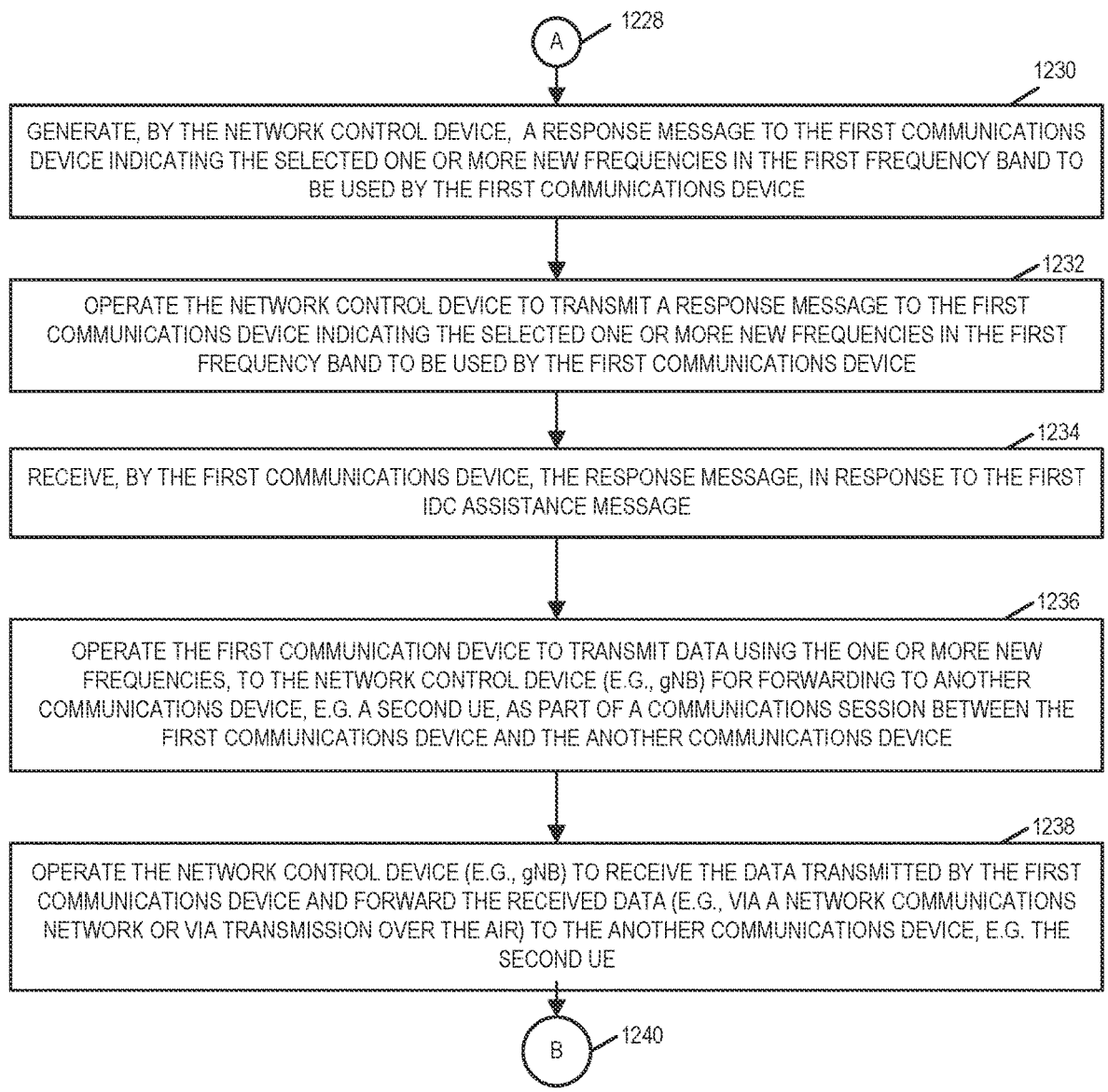
FIG. 12B is a second part of a flowchart of an exemplary method of operating a communications system in accordance with an exemplary embodiment.
Figure 12C:
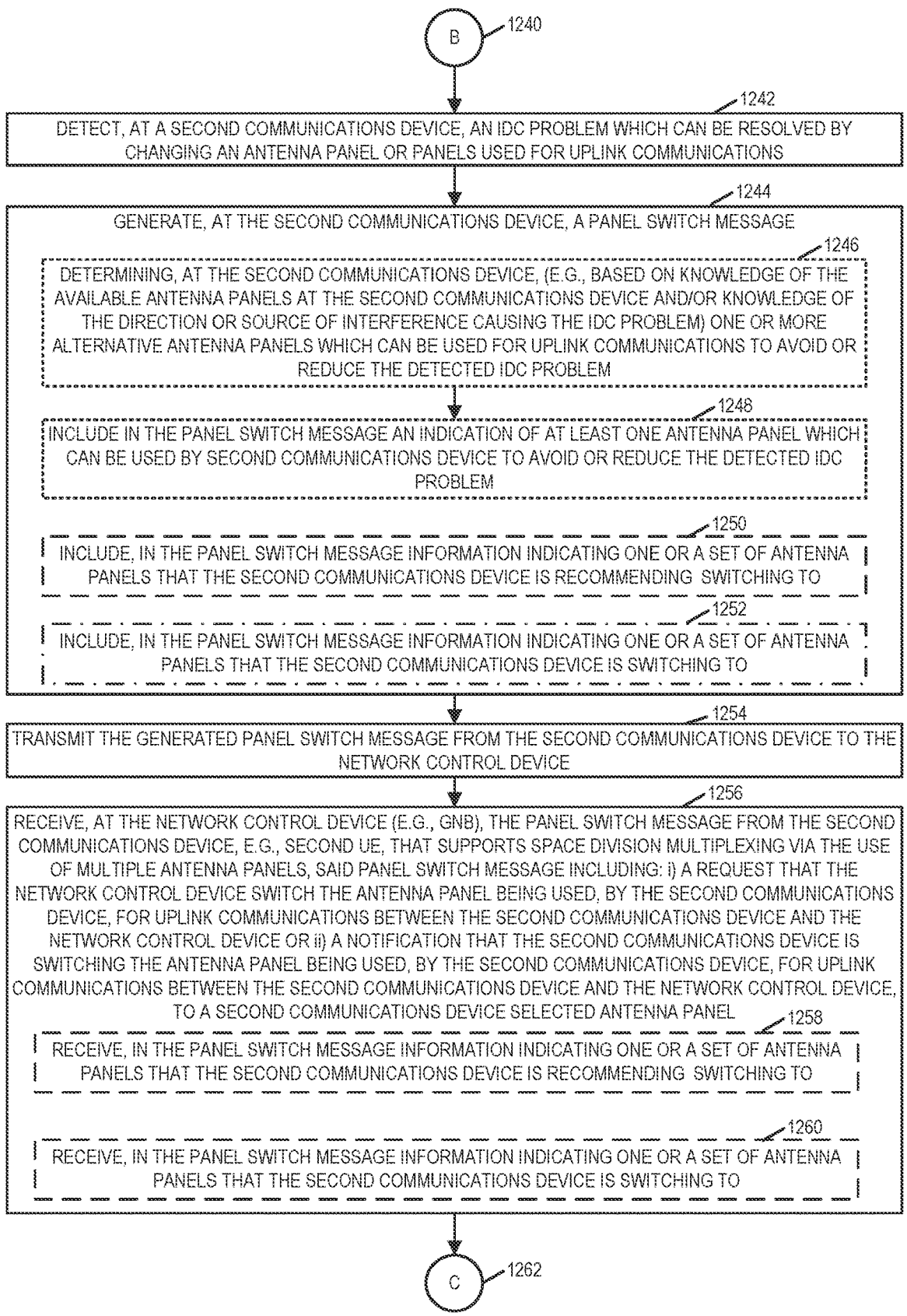
FIG. 12C is a third part of a flowchart of an exemplary method of operating a communications system in accordance with an exemplary embodiment.
Figures 12, 12D:
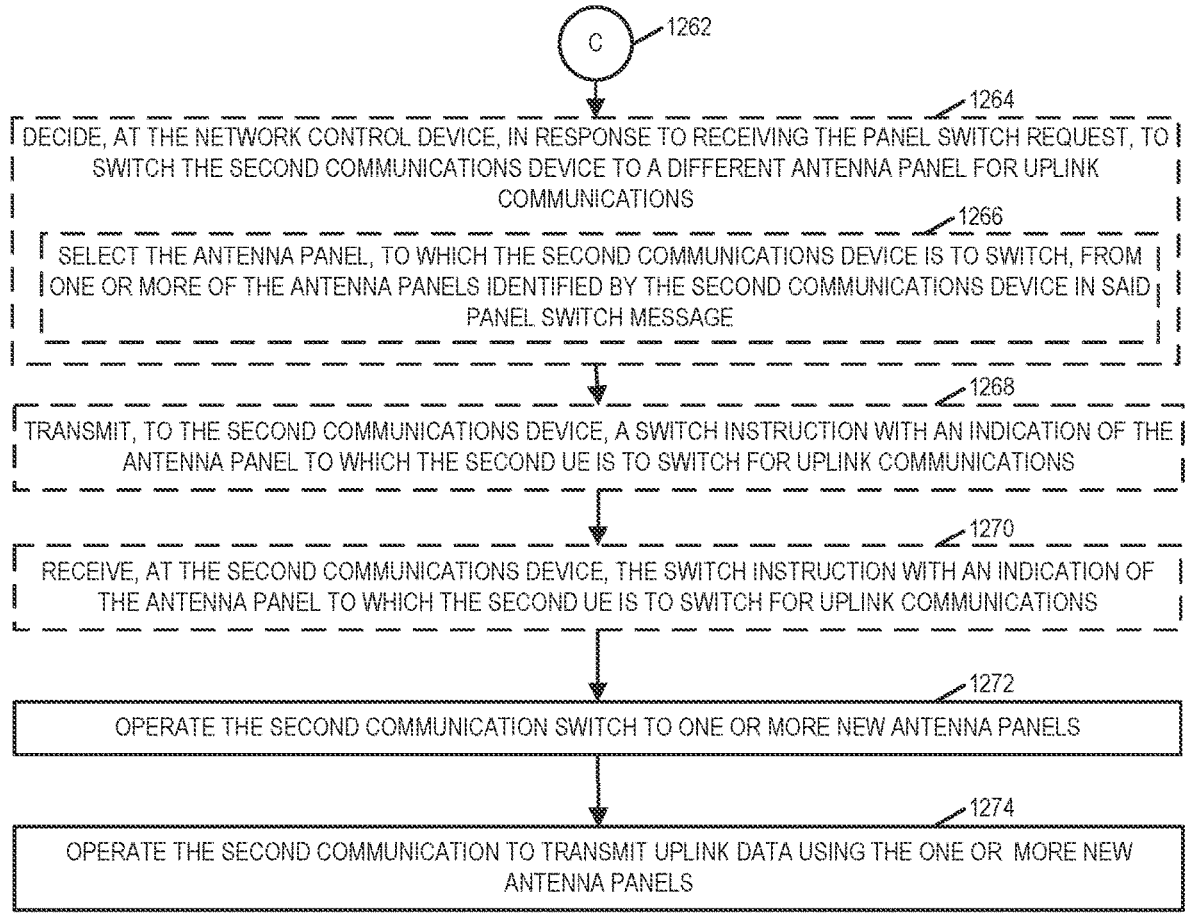
FIG. 12D is a fourth part of a flowchart of an exemplary method of operating a communications system in accordance with an exemplary embodiment.
FIG. 12 comprises the combination of FIG. 12A, FIG. 12B, FIG. 12C and FIG. 12D.

FIG. 12, comprising the combination of FIG. 12A, FIG. 12B, FIG. 12C and FIG. 12D, is a flowchart 1200, of an exemplary method of operating a communications system, e.g., a communications system supporting communications within the frequency range of 52.6-71 GHz and in which multiple different communications networks, e.g., a WiGig network and a NR cellular network may operate concurrently, in accordance with an exemplary embodiment. Operation starts in step 1202, in which the communications system is powered on and initialized. Operation proceeds from start step 1202 to step 1204.

In step 1204 a first communications device, e.g., a first user equipment (UE), detects an in-device coexistence (IDC) problem. The first communications device includes multiple radio transceivers, and at least one of the multiple radio transceivers is capable of operating at one or more frequencies within a first frequency band, e.g., a frequency band with the range of 52.6 GHz-71 GHz. In some embodiments, at least two of the multiple radio transceivers in the first communications device are capable of operating at one or more frequencies within the first frequency band. Operation proceeds from step 1204 to step 1206.

In step 1206 the first communications device generates a first in-device coexistence (IDC) assistance message. Step 1206 includes step 1208, in which the first communications device includes, in the first IDC assistance message, information indicating a wigig victim type. In some embodiments, step 1206 includes one or both of steps 1210 and 1212. In step 1210 the first communications device includes, in the first IDC assistance message, information indicating one or more new frequencies that the first communications device would prefer to use in a first frequency band (e.g., within a 52.6 to 71 GHz frequency band). In step 1212 the first communications device includes, in the first IDC assistance message, UE power amplifier (PA) characteristic information indicating one or more new characteristics of a power amplifier included in the first communications device. Operation proceeds from step 1206 to step 1214.

In step 1214 the first communications device transmits the generated first IDC assistance message to a network control device, e.g. a gNB. Operation proceeds from step 1214 to step 1215. In step 1215 the network control device, e.g., gNB, is operated to monitor for messages. Operation proceeds from step 1215 to step 1216.

In step 1216 the network control device, e.g. a gNB, receives the first IDC assistance message from the first communications device, e.g. first UE, which detected an in-device coexistence problem, said first IDC assistance message indicating a wigig victim type. Step 1216 may, and sometimes does, include one or both of steps 1218 and 1220. In step 1218 the network control device receives, in said first IDC assistance message, information indicating one or more new frequencies the first communications device would prefer to use in a first frequency bane (e.g., within a 52.6-71 GHz frequency band.) In step 1220 the network control device receives, in said first IDC assistance message, UE power amplifier (PA) characteristic information indicating one or more characteristics of a power amplifier included in the first communications device. Operation proceeds from step 1216 to step 1222.

In step 1222 the network control device selects one or more new frequencies to be used by the first communications device based on information included in the first IDC assistance message, said one or more new frequencies differing in at least one frequency from one or more frequencies in said first communications band that were being used by the first communications device when the first communications device detected said in-device coexistence problem. In some embodiments, step 1222 includes one or both of steps 1224 and 1226. In step 1224 the first communications device selects at least one frequency indicates in the first IDC assistance message as a preferred frequency, as one of said new frequencies. In step 1226 the first communications device selects at least some of the one or more frequencies to be included in the new frequencies based on the power amplifier information included in the first IDC assistance message. Operation proceeds from step 1222, via connecting node A 1228, to step 1230.

In step 1230 the network control device generates, a response message to the first communications device indicating the selected one or more new frequencies in the first frequency band to be used by the first communications device. Operation proceeds from step 1230 to step 1232.

In step 1232 the network control device transmits the generated response message to the first communications device, said response message indicating the selected one or more new frequencies in the first communications band to be used by the first communications device. Operation proceeds from step 1232 to step 1234.

In step 1234 the first communications device receives the response message sent from the network control device and recovers the communicated information, said response message being a response to the first IDC assistance message. Operation proceeds from step 1234 to step 1236.

In step 1236 the first communications device transmits data using the one or more frequencies to the network control device, e.g., gNB, for forwarding to another communications device, e.g. a second UE, as part of a communications session between the first communications device, e.g., the first UE, and the another communications device, e.g., the second UE. Operation proceeds from step 1236 to step 1238.

In step 1238 the network control device, e.g., gNB, receives the data transmitted by the first communications device and forwards, e.g. sends, the received data, e.g. via a communications network, e.g. a backhaul network and/or the Internet (e.g., first and second UE are coupled to different gNBs), or over the air (e.g., first UE and second UE are coupled to the same gNB), to another communications device, e.g., the second UE. Operation proceeds from step 1238, via connecting node B 1240 to step 1242.

In step 1242 a second communications device, e.g., a UE including a plurality of antenna panels, detects an IDC problem which can be resolved by changing an antenna panel or panels used for uplink communications. Operation proceeds from step 1242 to step 1244. In step 1244 the second communications device generates a panel switch message. In some embodiments, step 1244 includes steps 1246 and 1248. In step 1246 the second communications device determines, e.g. based on knowledge of the available antenna panels at the second communications device and/or knowledge of the direction or sources of interference causing the IDC problem, one or more alternative antenna panels which can be used for uplink communications to avoid or reduce the detected IDC problem. Operation proceeds from step 1246 to step 1248, in which the second communications device includes in the panel switch message information indicating one or a set of antenna panels which can be used by the second communications device to avoid or reduce the detected IDC problem.

In some embodiments, step 1244 includes step 1250 in which the second communications device includes, in the panel switch message, information indicating one or a set of antenna panels that second communications device is recommending switching to (e.g., the second device makes panel switch recommendations but the ultimate decision to perform a panel switch is made by the network control device). In some embodiments, step 1244 includes step 1252 in which the second communications device includes, in the panel switch message, information indicating one or a set of antenna panels that second communications device is switching to (e.g., the second communications device, which has the authority to make and implement panel switch decisions, is notifying the network control device that it is performing a panel switch operation). Operation proceeds from step 1244 to step 1254.

In step 1254 the second communications device transmits the generated panel switch message from the second communications device to the network control device. Operation proceeds from step 1254 to step 1256.

In step 1256 the network control device, e.g. gNB, receives the panel switch message from the second communications device, e.g. second UE, that supports space division via the use of multiple antenna panels, said panel switch message including: i) a request that the network control device switch the antennal being used by the second communications device for uplink communications between the second communications device and the network control device or ii) a notification that the second communications device is switching the antenna panel being used by the second communications device for uplink communication between the second communications device and the network control device, to a second communications device selected antenna panel. In some embodiments, step 1256 includes one of step 1258 and 1260. In step 1258 the network control device receives, in the panel switch message, information indicating one or a set of antenna panels that the second communications device is recommending switching to (e.g., the second communications device has sent a recommendation of a panel switch to the network control device, but the network control device is the device with the authority to make panel switch decisions and may, and sometimes does, act on the recommendation). In step 1260 the network control device receives, in the panel switch message, information indicating one or a set of antenna panels that the second communications device is switching to (e.g., the second communications device, which has the authority, has made a panel switch decision and notifies the network control device of the impending panel switch).

In some embodiments, e.g., an embodiment, in which the network control device is the device with the authority to make panel switch decisions, operation proceeds from step 1256, via connecting node C 1262 to step 1264. In some embodiments, e.g., an embodiment, in which the second communications device has the authority to make and implement panel switch decisions, operation proceeds from step 1256, via connecting node C 1262 to step 1272.

Returning to step 1264, in step 1264 the network control device, in response to receiving the panel switch request, decides to switch the second communications device to a different antenna panel for uplink communications. Step 1264 may, and sometimes does, includes step 1266 in which the network control device selects the antenna panel, to which the second communications device is to switch, from one or more of the antennal panels identified by the second communications device (as candidates for the antenna panel switch), in said panel switch message. Operation proceeds from step 1264 to step 1268.

In step 1268 the network control device transmits, to the second communications device, a switch instruction with an indication of the antenna panel to which the UE is to switch for uplink communications. Operation proceeds from step 1268 to step 1270.

In step 1270 the second communications device, receives the switch instruction with an indication of the antenna panel to which the second UE is to switch for uplink communications. Operation proceeds from step 1270 to step 1272.

In step 1272 the second communications device switches to one or more new antenna panels, e.g., in accordance with its decision as to which antenna panel to switch to, or in accordance with information in the received switch instruction from the network control device, e.g., gNB. Operation proceeds from step 1272 to step 1274. In step 1274 the second communications device transmits uplink data to the network control device, e.g., the gNB, using the one or more new antenna panels. For example, the transmitted uplink data is data intended for another communications device, which is in a communications session with the second communications device, and the network control device, e.g. gNB, is to forward the data toward the another communications device via a backhaul network and/or the Internet, or via a wireless downlink signal to the another communications device.

Figure 13:
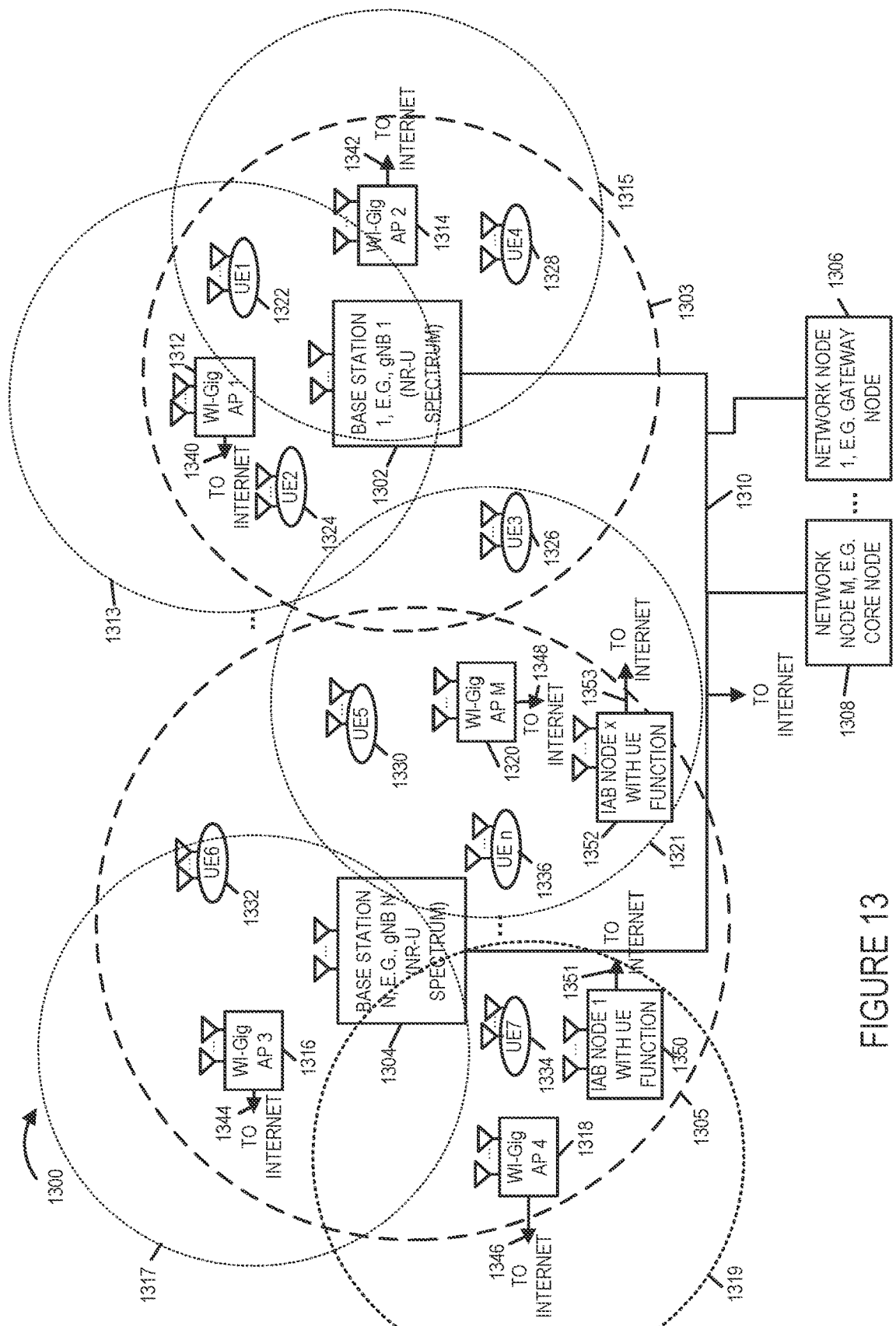
FIG. 13 is a drawing of an exemplary communications system in accordance with an exemplary embodiment.

FIG. 13 is a drawing of an exemplary communications system 1300 in accordance with an exemplary embodiment. Exemplary communications system 1300 includes a plurality of base station (NR base station 1 1302, e.g., gNB 1 using NR-U spectrum, ..., NR base station N 1304, e.g., gNB N using NR-U spectrum), each with a corresponding wireless coverage areas (1303, ..., 1305), respectively, and a plurality network nodes (network node 1, e.g. a gateway node, ..., network node M 1308, a core node), coupled together via backhaul network 1310 and coupled to the Internet. The base stations (1302, . . . , 1304) are sometimes referred to as network control devices. Exemplary communications system 1300 further includes a plurality of WI-Gig access points (Wi-Gig AP 1 1312, Wi-Gig AP 2 1314, Wi-Gig AP 3 1316, Wi-Gig AP 4 1318, . . . , WiGig AP M 1320), each with a corresponding wireless coverage area (1313, 1315, 1317, 1319, . . . , 1321) respectively. The Wi-Gig APs (1312, 1314, 1316, 1318, . . . , 1320) are coupled to the Internet via communications links (1340, 1342, 1344, 1346, . . . , 1348), respectively. Exemplary communications system 1300 further includes a plurality of user equipment devices (UE 1 1322, UE 2 1324, UE 3 1326, UE 4 1328, UE 5 1330, UE 6 1332, UE 7 1334, . . . , UE n 1336).

The communications system 100 further includes a plurality of IAB nodes with UE functionality (IAB node 1 1350, . . . , IAB node x 1352), which are coupled to the Internet via communications links (1351, . . . , 1353), respectively.

At least some of the UEs are mobile devices which may move throughout the communications system 100 and attach to different base stations and/or different APs at different times. At least some of the UEs support concurrent communications with both a base station and an AP, and may, and sometimes do, experience an in-device co-existence problem, e.g., with regard to new radio-unlicensed (NR-U) 60 GHz communications and Wi-Gig (60 GHz WiFi) communications. At least some of the IABs support concurrent communications with both a base station and an AP, and may, and sometimes do, experience an in-device co-existence problem, e.g., with regard to new radio-unlicensed (NR-U) 60 GHz communications and Wi-Gig (60 GHz WiFi) communications.

In some embodiments, a communications device, e.g. a UE, which detects an IDC problem with regard to Wi-Gig, e.g., which it can not handle on its own, generates and sends an IDC assistance message to a network control device, e.g., a gNB, said IDC assistance message including: i) information identifying the problem frequency or frequencies, ii) information identifying the victim system as wigig, iii) (optionally including) information identifying UE selected preferred frequencies, and iv) (optionally including) UE power amplifier characteristic information. The network control device, e.g., gNB, responds to the IDC assistance message with a response message indicating one or more new frequencies to be used by the UE. The UE implements the change and uses the new frequencies for UL NR signaling to the NR base station, thus reducing or eliminating the IDC problem.

In some embodiments, a communications device, e.g. a UE, including multiple switchable antenna panels (e.g., for UL NR transmissions in 60 GHz NR spectrum) which detects an IDC problem with regard to Wi-Gig (60 GHz WiFi), e.g., which it can not handle on its own, generates and sends an panel switch request message to a network control device, e.g., a gNB. In some embodiments, the panel switch request message includes information identifying a recommended panel or panels to which the UE would like to be switched to. The network control device, e.g. gNB, receives the panel switch request message and sends a response, e.g., a panel switch instruction message, notifying the UE that the panel switch request is being granted, identifying the antenna panel or panels to be used following the switch, and indicating when the switch is to be implemented. The UE implements the panel switch in accordance with the received instructions and uses the newly designated antenna panel(s) for UL NR signaling to the NR base station, thus reducing or eliminating the IDC problem.

Figure 14:
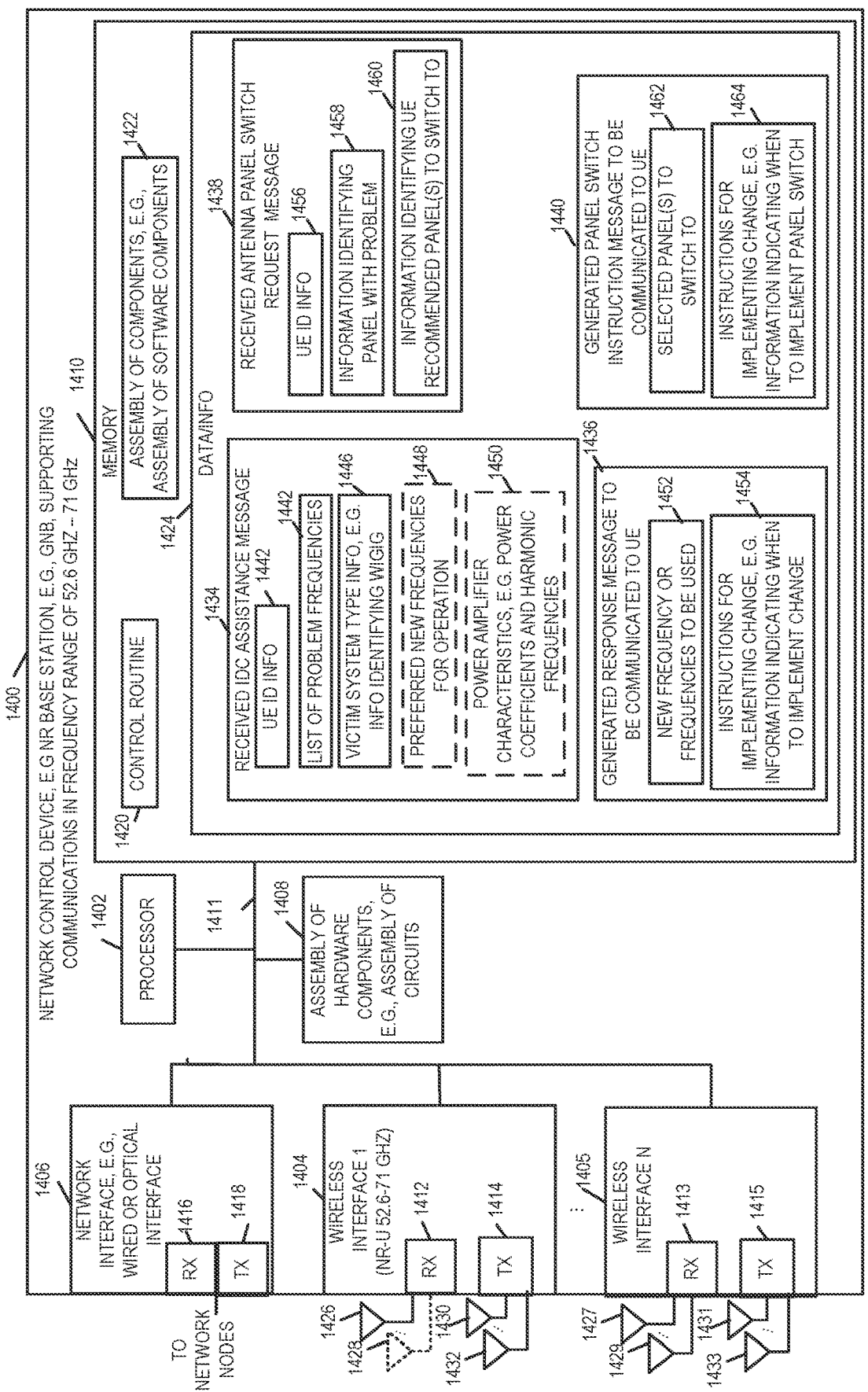
FIG. 14 is a drawing of an exemplary network control device, e.g. a gNB, in accordance with an exemplary embodiment.

FIG. 14 is a drawing of an exemplary network control device 1400, e.g. a NR base station, e.g. a gNB, supporting communications in frequency range of 52.6 GHz-71 GHz, in accordance with an exemplary embodiment. Network control device 1400, is, e.g. any of the base stations (base station 1 1302, . . . , base station N 1304) of FIG. 13, and/or a network control device, e.g. gNB, implementing steps of any of the methods of flowchart 900 of FIG. 9, flowchart 1000 of FIG. 11, and/or flowchart 1200 of FIG. 12.

Network control device 1400 includes a processor 1402, e.g., a CPU, a plurality of wireless interfaces (wireless interface 1 1404, . . . , wireless interface N 1405), a network interface 1406, e.g., a wired or optical interface, an assembly of hardware components 1408, e.g. assembly of circuits, and memory 1410 coupled together via a bus 1411 over which the various elements may interchange data and information. Wireless interface 1 1404, which supports NR-U spectrum communications in a frequency range of 52.6 GHz-71 GHz, includes a wireless receiver 1412 coupled to a plurality of receive antennas (1426, . . . , 1426) and a wireless transmitter 1414 coupled to a plurality of transmit antennas (1430, . . . , 1432). Wireless interface N 1405 includes a wireless receiver 1413 coupled to a plurality of receive antennas (1427, . . . , 1429) and a wireless transmitter 1415 coupled to a plurality of transmit antennas (1431, . . . , 1433). Network interface 1406 includes a receiver 1416 and a transmitter 1418, which coupled to network control device 1400 to other network nodes, e.g., other gNB, gateway devices, core network nodes, etc. and/or the Internet, e.g. via a backhaul network.

Memory 1410 includes a control routine 1420, e.g., for controlling basic network control device functionality, and an assembly of components 1422, e.g. assembly of software components, software routines, software modules, APPs, etc., and data/information 1424. Data/information 1424 includes a received IDC assistance message 1434, e.g., from a first UE experiencing an IDC problem, e.g., with regard to NR-U communications and WiGig communications, a generated response message 1436, e.g., to be communicated to the first UE in response to the received IDC assistance message, a received antenna panel switch request 1438, e.g. from a second UE, and a generated panel switch instruction message 1440, e.g., to be sent to the second UE in response to the received panel switch request message from the second UE. Received IDC assistance message 1434 includes UE ID information 1442, a list 1444 of problem frequencies, and victim type information 1446, e.g., information identifying WiGig. In some embodiments, the received IDC assistance message 1434 further includes one or both of information 1448 identifying preferred new frequencies for operation and power amplifier characteristics information 1450, e.g. power coefficients and/or harmonic frequencies. Generated response message 1436 includes information 1452 identifying a new frequency or new frequencies to be used by the UE, e.g. for UL NR-U transmissions, and instruction 1545 for implementing the change to the new frequency or frequencies, e.g. information indicating the time or the point in the timing structure in which to implement the changeover.

Received antenna panel switch request message 1438 includes UE ID information 1456, information 1458 identifying the antenna panel being used by the UE to which the detected IDC problem corresponds, and information 1460 identifying UE recommended antenna panel or panels to switch to. Generate panel switch instruction message 1440 includes information 1462 identifying the selected antenna panel(s) that the UE is to switch to, and instructions 1464 for implementing the change to the new antenna panel or panels, e.g. information identifying the time or point in a timing structure when the transmit antenna panel change is to be implemented by the UE.

Figure 15:
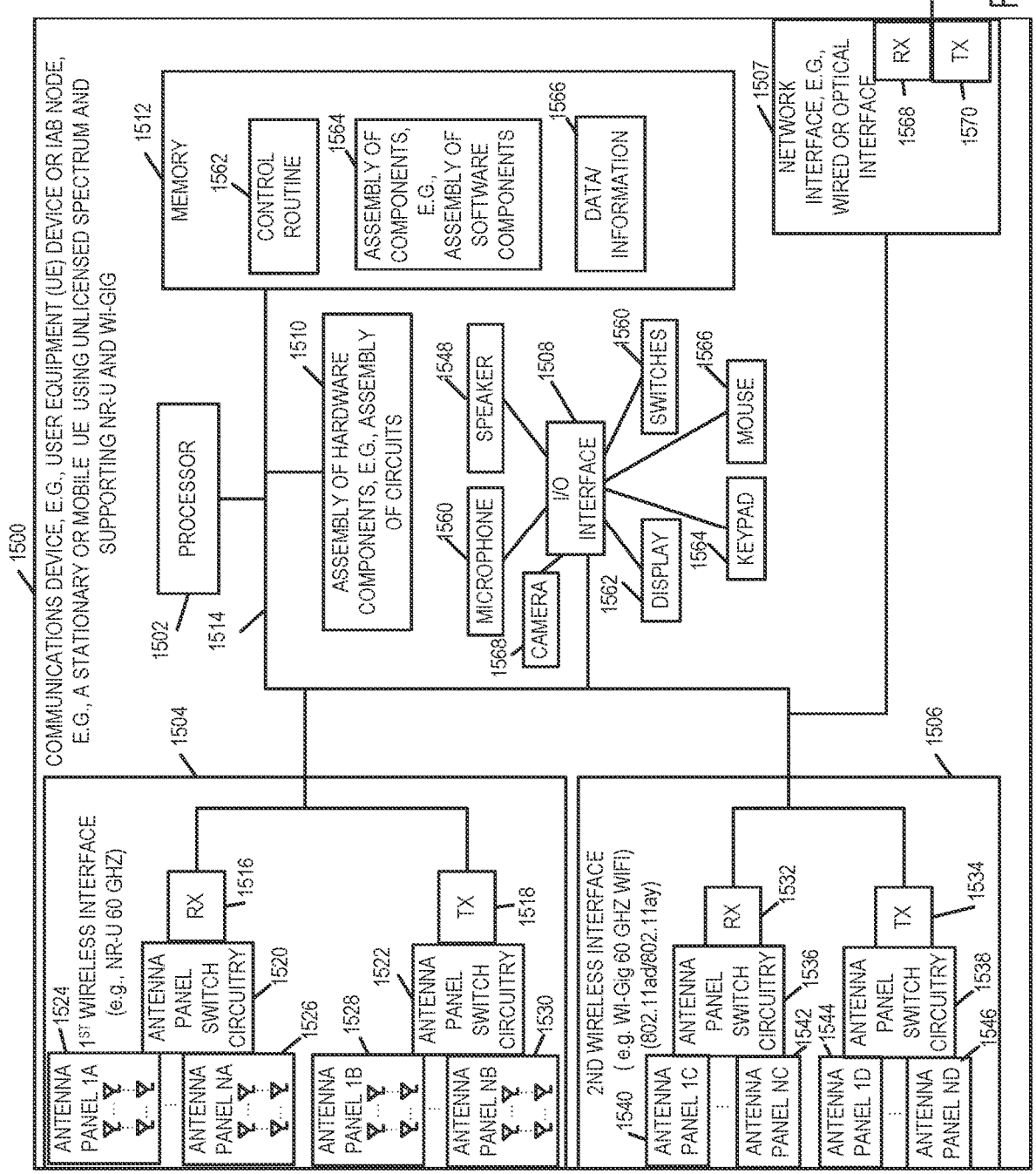
FIG. 15 is a drawing of an exemplary communications device, e.g. a user equipment (UE) device, in accordance with an exemplary embodiment.

FIG. 15 is a drawing of an exemplary communications device 1500, e.g., a user equipment (UE) device or an integrated access and backhaul (IAB) node with UE functionality, e.g., a stationary or mobile UE using unlicensed spectrum and using new radio-unlicensed (NR-U) spectrum and supporting NR-U and W-Gig communications. Exemplary communications device 1500 is, e.g., any of the UEs (1322, 1324, 1326, 1328, 1330, 1332, 1334, . . . , 1336) of system 1300 of FIG. 13 or any of the IAB nodes with UE functionality (IAB node 1 1350, . . . IAB node x 1352) of system 1300 of FIG. 13.

Exemplary communications device 1300 includes a processor 1502, e.g., a CPU, a 1st wireless interface 1504, e.g., NR-U 60 GHz wireless interface, and a 2nd wireless interface 1506, e.g., a Wi-FIG. 60 wireless interface sometimes referred to as a 60 GHz WiFi interface, e.g. supporting IEEE 802.11 ad/802.11ay, a network interface 1507, an input/output (I/O) interface 1508, an assembly of hardware components 1510, e.g., assembly of circuits, and memory 1512 coupled together via a bus 1514 via which the various elements may interchange data and information.

The 1st wireless interface 1504, e.g., a NR-U 60 GHz wireless interface, includes a wireless receiver 1516, antenna panel switch circuitry 1520, and a plurality of antennal panels (antenna panel 1A 1524, . . . , antenna panel NA 1526). The antenna panel switch circuitry 1520 allows different panel(s) to be connected to the wireless receiver 1516 at different times, e.g. under control of processor 1502. The 1st wireless interface 1504, e.g., a NR-U 60 GHz wireless interface, further includes a wireless transmitter 1518, antenna panel switch circuitry 1522, and a plurality of antennal panels (antenna panel 1B 1528, . . . , antenna panel NB 1530). The antenna panel switch circuitry 1522 allows different panel(s) to be connected to the wireless transmitter 1518 at different times, e.g. under control of processor 1502. In some embodiments, the 1st wireless interface 1504 is a NR-U 60 GHz transceiver including switchable antenna panels.

The 2nd wireless interface 1506, e.g., a Wi-Gig wireless interface, includes a wireless receiver 1532, antenna panel switch circuitry 1536, and a plurality of antennal panels (antenna panel 1C 1540, . . . , antenna panel NC 1542). The antenna panel switch circuitry 1536 allows different panel(s) to be connected to the wireless receiver 1532 at different times, e.g. under control of processor 1502. The 2nd wireless interface 1506, e.g., a Wi-Gig wireless interface, further includes a wireless transmitter 1534, antenna panel switch circuitry 1534, and a plurality of antennal panels (antenna panel 1D 1544, . . . , antenna panel ND 1546). The antenna panel switch circuitry 1538 allows different panel(s) to be connected to the wireless transmitter 1534 at different times, e.g. under control of processor 1502. In some embodiments, the 2nd wireless interface 1506 is a Wi-Gig transceiver including switchable antenna panels.

Network interface 1507, e.g., a wired or optical interface 1507, which includes a receiver 158 and transmitter 1570, allows the communications device to connect to a backhaul via a wired on optical connection, when available.

Exemplary communications device 1500 further includes a plurality of input/output devices (speaker 1548, switches 1560, display 1562, e.g., a touch screen display, keypad 1564, mouse 1566, camera 1568 and microphone 1560), which are coupled to the bus 1514, via I/O interface 1508, allowing the various I/O devices to communicate with other elements within communications device 1500.

Memory 1512 includes a control routine 1562, an assembly of components 1564, e.g., assembly of software components, software modules, software routines, APPs, etc., and data/information 1566. Exemplary data/information 1566 includes, e.g., a generated IDC assistance message to be sent to a network control device, e.g. gNB, said IDC assistance message indicating: affected frequencies, wigig as the victim system, optionally including recommended frequencies to be switch to, and optionally including UE power amplifier characteristic information, a received response message from the network control device indicating new frequencies to be switched to and optionally includes instructions for performing the switch. Exemplary data/information 1566 also includes, e.g., a generated antenna panel switch request message to be sent to a network control device, e.g. indicating that the UE is requesting the network control device to instruct the UE to switch an antenna panel being used by the UE for NR-U transmissions to another panel, e.g. to reduce of eliminate an IDC problem with regard to Wi-Gig communications, and a received instruction message from the network control device instructing the UE to switch to a new panel or new set of panels identified in the instruction message, e.g. for UL transmissions to the gNB using the NR-U.

Figure 16A:
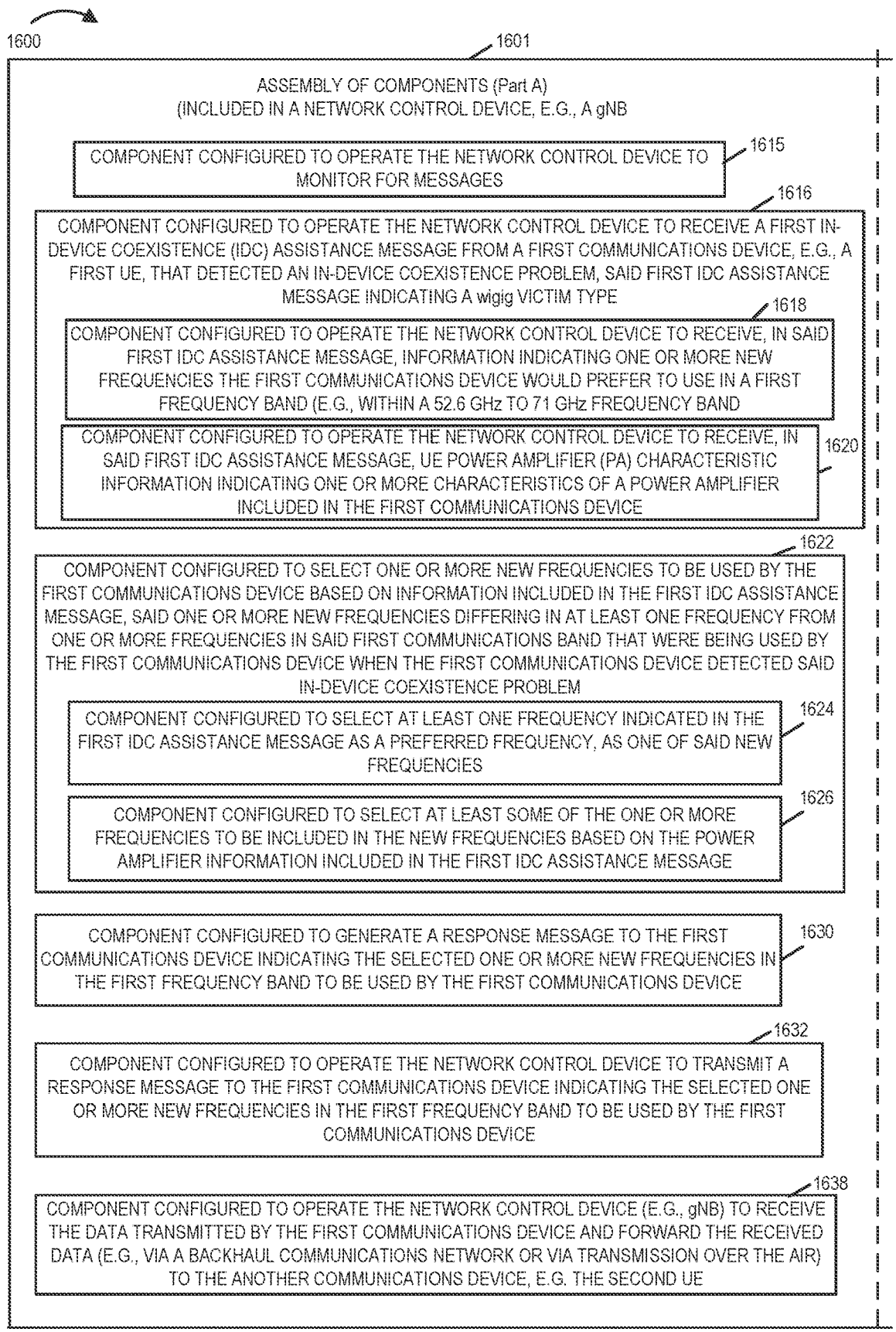
FIG. 16A is a first part of an exemplary assembly of components which may be included in a network control device, e.g. a gNB, in accordance with an exemplary embodiment.
Figures 16, 16A, 16B:
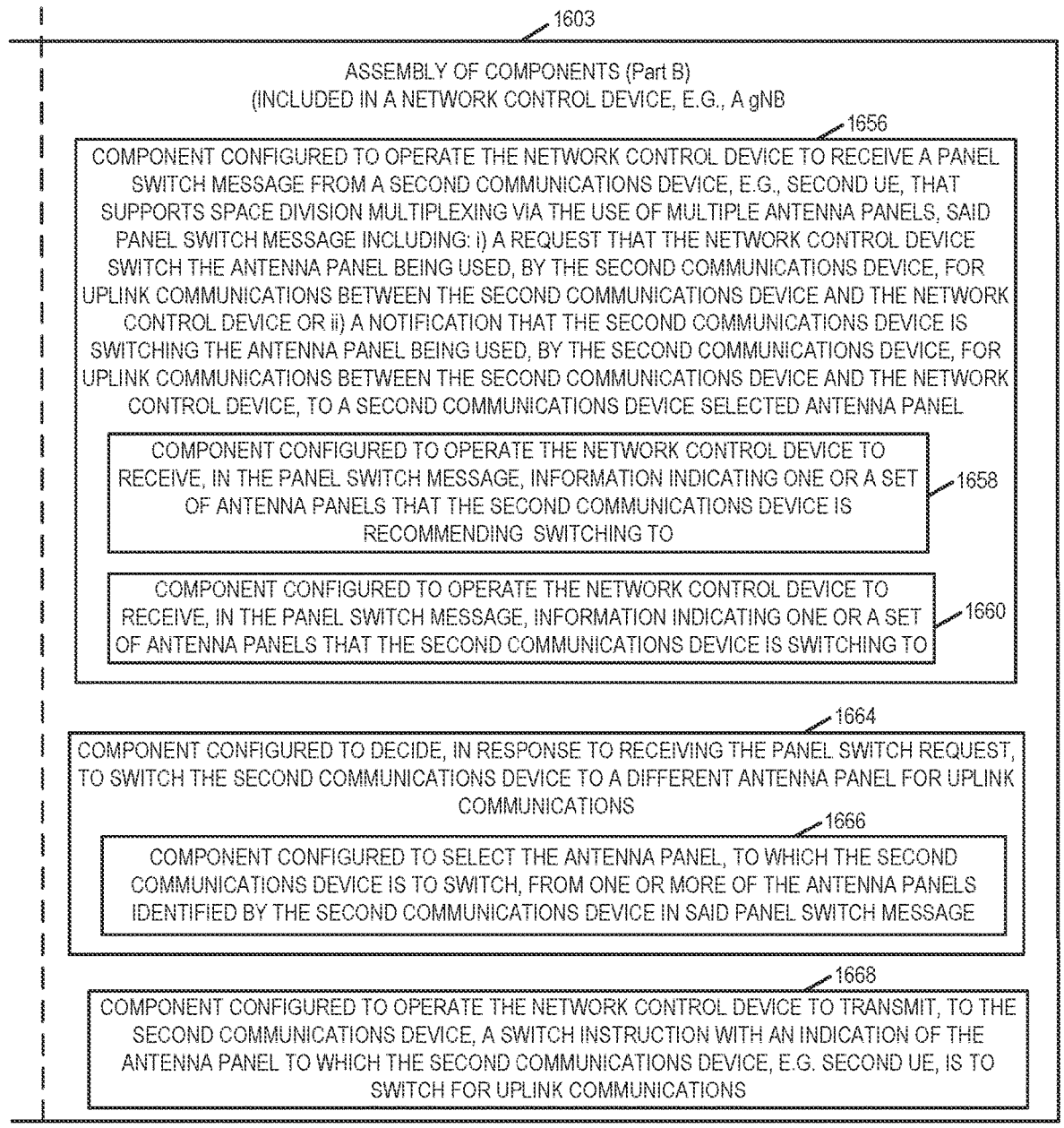
FIG. 16B is a second part of an exemplary assembly of components which may be included in a network control device, e.g. a gNB, in accordance with an exemplary embodiment.
FIG. 16 comprises the combination of FIG. 16A and FIG. 16B.

FIG. 16, comprising the combination of FIG. 16A and FIG. 16B, is a drawing of an exemplary assembly of components 1600, comprising Part A 1601 and Part B 1603, which may be included in a network control device, e.g. a gNB, in accordance with an exemplary embodiment. Exemplary assembly of components 1600 is, e.g. included in base stations, e.g. gNBs, 1302, 1304 of FIG. 13, network control device 1400, e.g., a gNB of FIG. 14, and/or a network control device implementing steps of flowchart 900 of FIG. 9, flowchart 1100 of FIG. 11, and/or flowchart 1200 of FIG. 12.

The components in the assembly of components 1600 can, and in some embodiments are, implemented fully in hardware within a processor, e.g., processor 1402, e.g., as individual circuits. The components in the assembly of components 1600 can, and in some embodiments are, implemented fully in hardware within the assembly of hardware components 1408, e.g., as individual circuits corresponding to the different components. In other embodiments some of the components are implemented, e.g., as circuits, within processor 1402 with other components being implemented, e.g., as circuits within assembly of components 1408, external to and coupled to the processor 1402. As should be appreciated the level of integration of components on the processor and/or with some components being external to the processor may be one of design choice. Alternatively, rather than being implemented as circuits, all or some of the components may be implemented in software and stored in the memory 1410 of the network control device 1400, e.g., a gNB, with the components controlling operation of the network control device to implement the functions corresponding to the components when the components are executed by a processor e.g., processor 1402. In some such embodiments, the assembly of components 1600 is included in the memory 1410 as part of assembly of software components 1422. In still other embodiments, various components in assembly of components 1600 are implemented as a combination of hardware and software, e.g., with another circuit external to the processor providing input to the processor which then under software control operates to perform a portion of a component's function.

When implemented in software the components include code, which when executed by a processor, e.g., processor 1402, configure the processor to implement the function corresponding to the component. In embodiments where the assembly of components 1600 is stored in the memory 1410, the memory 1410 is a computer program product comprising a computer readable medium comprising code, e.g., individual code for each component, for causing at least one computer, e.g., processor 1402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 16 control and/or configure the network control device 1400 or elements therein such as the processor 1402, to perform the functions of corresponding steps illustrated and/or described in the method of one or more of the flowcharts, signaling diagrams and/or described with respect to any of the Figures. Thus, the assembly of components 1600 includes various components that perform functions of corresponding one or more described and/or illustrated steps of an exemplary method, e.g., steps of the method of flowchart 900 of Figure, flowchart 1100 of FIG. 11 and/or flowchart 1200 of FIG. 12.

Assembly of components 1600 includes a component 1615 configured to operate the network control device to monitor for messages, and a component 1616 configured to operate the network control device to receive a first in-device coexistence (IDC) assistance message from a first communication device, e.g. a first UE, that detected an in-device coexistence problem, said first IDC assistance message indicating a wigig victim type. Component 1616 includes a component 1618 configured to operate the network control device to receive, in said first IDC assistance message, information indicating one or more new frequencies the first communications device the first communications device would prefer to use in a first frequency band (e.g., within a 52.6 GHz to 71 GHz frequency band), and a component 1620 configured to operate the network control device to receive, in said first IDC message, communications device (e.g. UE) power amplifier (PA) characteristic information indicating one or more characteristics of a power amplifier included in the first communications device.

Assembly of components 1600 further includes a component 1622 configured to select one or more new frequencies to be used by the first communications device, said one or more new frequencies differing in at least one frequency from one or more frequencies in said first communications band that were being used by the first communications device when the first communications device detected said in-device coexistence problem. Component 1622 includes a component 1624 configured to select at least one frequency, indicated in the first IDC message as a preferred frequency, as one of said new frequencies, and a component 1626 configured to select at least some of the one or more frequencies to be included in the new frequencies based on the power amplifier information included in the first IDC assistance message.

Assembly of components 1600 further includes a component 1630 configured to generate a response message to the first communications device indicating the selected one or more new frequencies in the first frequency band to be used by the first communications device, a component 1632 configured to operate the network control device to transmit a response message to the first communications device indicating the selected one or more new frequencies in the first frequency band to be used by the first communications device, and a component 1638 configured to operate the network control device, e.g. gNB, to receive data transmitted by the first communications device and forward the received data, e.g. via a backhaul communications network or via transmission over the air, e.g., to another communications device, e.g., a second UE.

Assembly of components 1600 further includes a component 1656 configured to operate the network control device to receive a panel switch message from a second communications device, e.g., a second UE, that supports space division multiplexing via the use of multiple antenna panels, said panel switch message including: i) a request that the network control device switch the antenna panel being used by the second communications device, for uplink communications between the second communications device and the network control device or ii) a notification that the second communications device is switching the antenna panel being used, by the second communications device for uplink communications between the second communications device and the network control device, to a second communications device selected antenna panel. Component 1656 includes a component 1658 configured to operate the network control device to receive, in the panel switch message, information indicating one or a set of antennas panes that the second communications device is recommending switching to and a component 1660 configured to operate the network control device to receive, in the panel switch message, information indicating one or a set of panels that the second communications device is switching to.

Assembly of components 1600 further includes a component 1664 configured to decide, in response to receiving the panel switch request, to switch the second communications device to a different antenna panel for uplink communications. Component 1664 includes a component 1666 configured to select the antenna panel, to which the second communications device is to switch, from one or more of the antenna panels identified by the second communications device in said panel switch message. Assembly of components 1600 further includes a component 1668 configured to operate the network control device to transmit, to the second communications device, a switch instruction with an indication of the antenna panel to which the second communications device, e.g. second UE, is to switch for uplink communications.

Figure 17A:
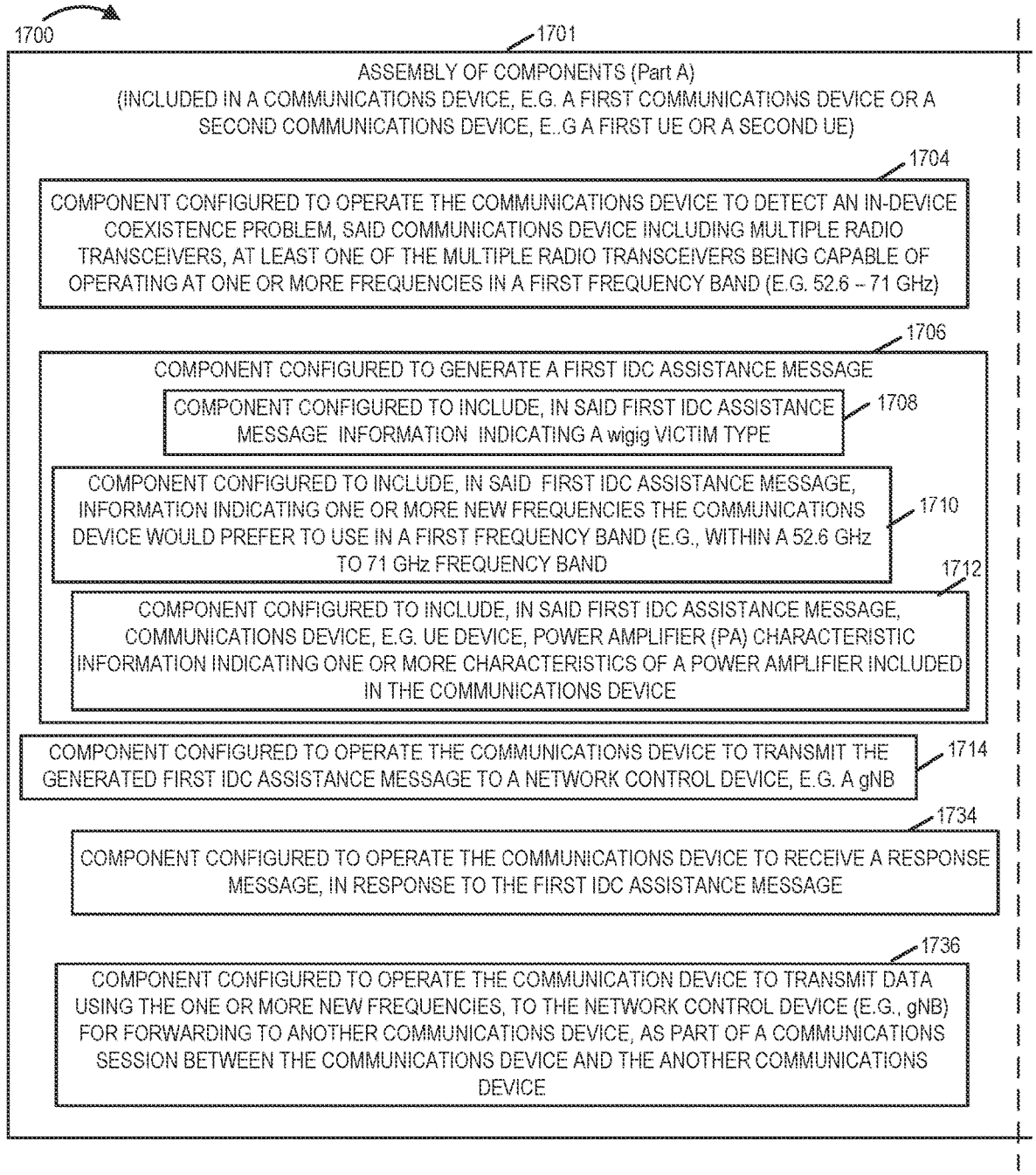
FIG. 17A is a first part of an exemplary assembly of components which may be included in an exemplary communications device, e.g. a UE, in accordance with an exemplary embodiment.
Figures 17, 17A, 17B:
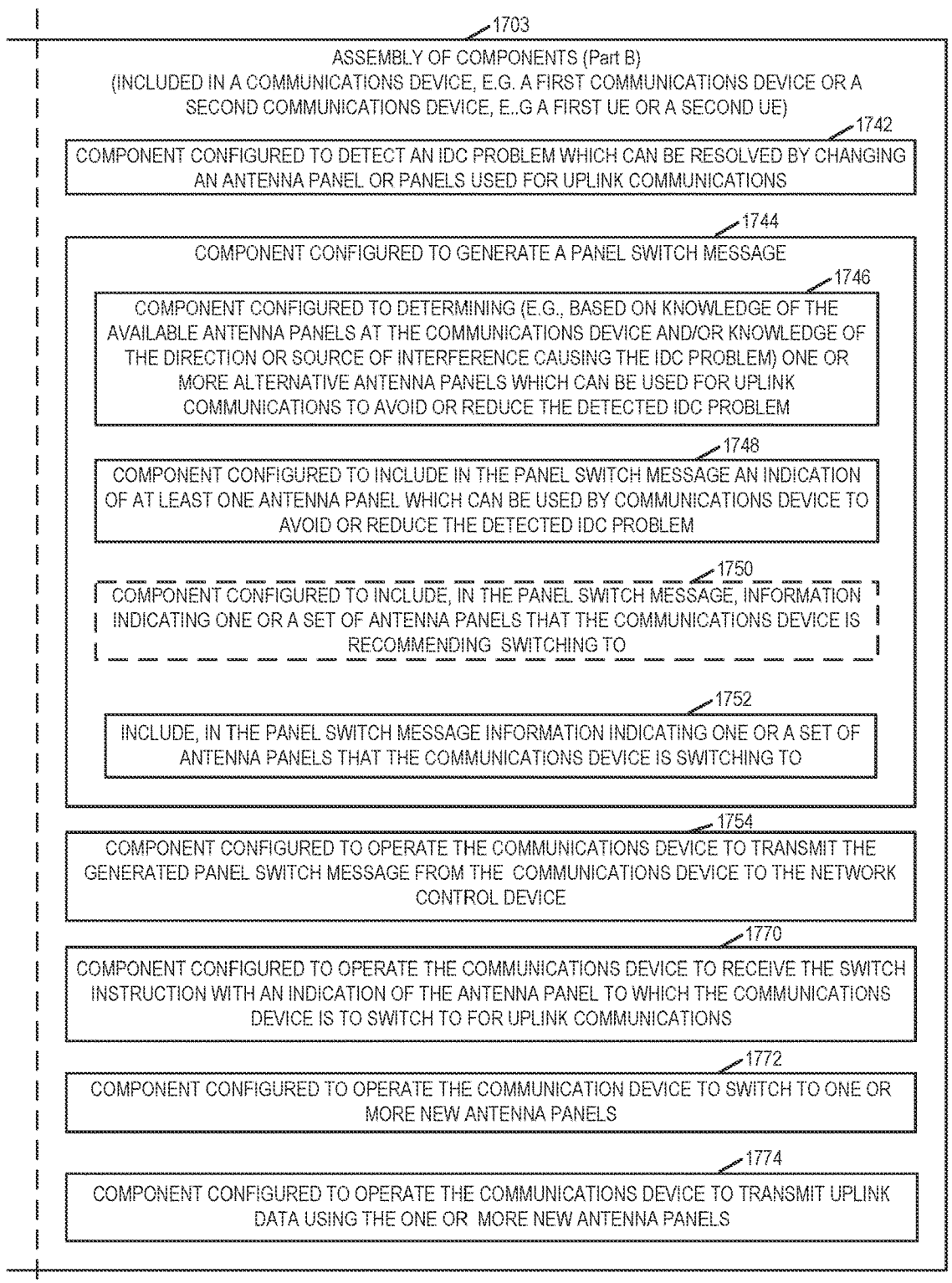
FIG. 17B is a second part of an exemplary assembly of components which may be included in an exemplary communications device, e.g. a UE, in accordance with an exemplary embodiment.
FIG. 17 comprises the combination of FIG. 17A and FIG. 17B.

FIG. 17, comprising the combination of FIG. 17A and FIG. 17B, is a drawing of an exemplary assembly of components 1700, comprising Part A 1701 and Part B 1703, which may be included in an exemplary communications device, e.g., a first communications device (first UE) or a second communications device (second UE), in accordance with an exemplary embodiment. Assembly of components 1700 is, e.g., include in any of the UEs (1322, 1324, 1326, 1328, 1332, 1334, . . . , 1336) or any of the IAB nodes with UE functionality (1350, . . . , 1352) of system 1300 of FIG. 1300 or communications device 1500, e.g., a UE, of FIG. 15, or a communications device implementing steps of a method of flowchart 900 of FIG. 9, flowchart 1100 of FIG. 11 and/or flowchart 1200 of FIG. 12.

The components in the assembly of components 1700 can, and in some embodiments are, implemented fully in hardware within a processor, e.g., processor 1502, e.g., as individual circuits. The components in the assembly of components 1700 can, and in some embodiments are, implemented fully in hardware within the assembly of hardware components 1510, e.g., as individual circuits corresponding to the different components. In other embodiments some of the components are implemented, e.g., as circuits, within processor 1502 with other components being implemented, e.g., as circuits within assembly of components 1510, external to and coupled to the processor 1502. As should be appreciated the level of integration of components on the processor and/or with some components being external to the processor may be one of design choice. Alternatively, rather than being implemented as circuits, all or some of the components may be implemented in software and stored in the memory 1512 of the communications device, e.g., UE device, 1500, with the components controlling operation of the communications device to implement the functions corresponding to the components when the components are executed by a processor e.g., processor 1502. In some such embodiments, the assembly of components 1700 is included in the memory 1512 as part of assembly of software components 1564. In still other embodiments, various components in assembly of components 1700 are implemented as a combination of hardware and software, e.g., with another circuit external to the processor providing input to the processor which then under software control operates to perform a portion of a component's function.

When implemented in software the components include code, which when executed by a processor, e.g., processor 1502, configure the processor to implement the function corresponding to the component. In embodiments where the assembly of components 1700 is stored in the memory 1512, the memory 1512 is a computer program product comprising a computer readable medium comprising code, e.g., individual code for each component, for causing at least one computer, e.g., processor 1502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 17 control and/or configure the communications device, e.g., UE device, 1500 or elements therein such as the processor 1502, to perform the functions of corresponding steps illustrated and/or described in the method of one or more of the flowcharts, signaling diagrams and/or described with respect to any of the Figures. Thus, the assembly of components 1700 includes various components that perform functions of corresponding one or more described and/or illustrated steps of an exemplary method, e.g., steps of the method of flowchart 900 of FIG. 9, the method of flowchart 1100 of FIG. 11, and/or the method of flowchart 1200 of FIG. 12.

Assembly of components 1700 includes a component 1704 configured to operate the communications device to detect an in-device coexistence (IDC) problem, said communications device including multiple radio transceivers (e.g., a NR-U 60 GHz transceiver and a WiGig (60 GHz WiFi) transceiver), at least one of the multiple radio transceiver being capable of operating at one or more frequencies in a first frequency band (e.g., 52.6 GHz-71 GHz), and a component 1706 configured to generate a first IDC assistance message. Component 1706 includes a component 1708 configured to include, in the first IDC assistance message, information indicating a wigig victim type, a component 1710 configured to include, in said first IDC assistance message, information indicating one or more new frequencies that the communications device would prefer to used in a first frequency band (e.g., within a 52.6 to 71 GHz frequency band) and a component 1712 configured to include, in said first IDC assistance message, communications device, e.g. UE device, power amplifier (PA) characteristic information indicating one or more characteristics of a power amplifier included in the communications device. Assembly of components 1700 further includes a component 1714 configured to operate the communications device to transmit the generated first IDC assistance message to a network control device, e.g. a gNB, a component 1734 configured to operate the communications device to receive a response message in response to the first IDC assistance message, and a component 1736 configured to operate the communications device to transmit data using one or more new frequencies to the network control device, e.g. gNB, for forwarding to another communications device, as part of a communications session between the communications device and the another communications device.

Assembly of components 1700 further includes a component 1742 configured to detect an IDC problem which can be resolved by changing an antenna panel or panels used for uplink communications, and a component 1744 configured to generate a panel switch message. Component 1744 includes a component 1746 configured to determine, e.g. based on knowledge of the available antenna panels at the communications device and/or knowledge of the direction or source of interference causing the IDC problem, one or more alternative antenna panels which can be used for uplink communications to avoid or reduce the detected IDC problem, a component 1748 configured to include in the panel switch message an indication of at least one antenna panel which can be used by the communications device to avoid or reduce the detected IDC problem, a component 1750 configured to include in the panel switch message information indicating one or a set of antenna panels that the communications device is recommending switching to, and a component 1752 configured to include, in the panel switch message, information indicating one or a set of antenna panels that the communications device is switching to.

Assembly of components 1700 further includes a component 1754 configured to operate the communications device to receive a switch instruction with an indication of the antenna panel to which the communications device is to switch to for uplink communications, a component 1772 configured to operate the communications device to switch to one or more new antenna panels, and component 1774 configured to operate the communications device to transmit uplink data using the one or more new antenna panels.

In the following numbered lists of exemplary embodiments references to a previous numbered embodiment refers to an embodiment in the same numbered list in which the reference is made. For example, references to other numbered embodiments in the first numbered list refer to a numbered embodiment in the first numbered list and a reference to another numbered embodiment in the second list refers a numbered embodiment in the second list.

First Numbered List of Exemplary Method Embodiments

Method Embodiment 1 A communications method, the method comprising: operating (1215) a network control device (e.g. gNB) to monitor for messages; and receiving (1216), at the network control device (e.g., gNB), a first in-device coexistence (IDC) assistance message from a first communications device (e.g., first UE) that detected an in-device coexistence problem, the first IDC assistance message indicating a wigig victim type.

Method Embodiment 2 The method of Method Embodiment 1, wherein the wigig victim type indicator indicates a victim type in the NR frequency band.

Method Embodiment 3 The method of Method Embodiment 2, wherein said NR frequency band is within a frequency range of 52.6-71 GHz and is NR unlicensed.

Method Embodiment 4 The method of Method Embodiment 3, wherein the wigig victim type indicator indicates there is a in-device coexistence problem between a channel being used by the first communications device for Wi-Gig (sometimes referred to as 60 GHz WiFi or IEEE 802.11ad and/or 802.11ay) and a channel being used by the first communications device for NR (52.6-71 GHz) (sometimes referred to as 60 GHz NR).

Method Embodiment 5 The method of Method Embodiment 1, wherein the first IDC assistance message further indicates one or more of: i) preferred new frequency information indicating one or more new frequencies the first communicates device would prefer to use in a first frequency band (e.g., within a 52.6 GHz to 71 GHz frequency band) to which the detected IDC problem relates; or ii) UE power amplifier characteristic information indicating one or more characteristics of a power amplifier included in the first communications device; and wherein the method further includes: selecting (1216) (e.g., determining) at the network control device, one or more new frequencies to be used by the first communications device based on information included in said first IDC assistance message, said one or more new frequencies differing in at least one frequency from one or more frequencies in said first communications band that were being used by said first communications device when said first communications device detected said in-device coexistence problem; and transmitting (1232) a response message to the first communications device indicating the selected one or more new frequencies in the first frequency band to be used by the first communications device.

Method Embodiment 6 The method of Method Embodiment 1, wherein the first frequency band is a New Radio (NR) frequency band that includes 52.6 GHz to 71 GHz.

Method Embodiment 7 The method of Method Embodiment 5, wherein the first IDC assistance message includes preferred new frequency information; and wherein said step of selecting (1222) said one or more new frequencies includes selecting (1224) at least one frequency indicated in the first IDC assistance message as a preferred frequency as one of said new frequencies.

Method Embodiment 8 The method of Method Embodiment 7, wherein the first IDC assistance message further includes UE power amplifier characteristic information (e.g. harmonic information indicating harmonics which may be generated and/or which frequencies in the first frequency band can amplified by the first communications device with less distortion than other frequencies in the first frequency band); and wherein said step of selecting (1222) said one or more new frequencies further includes selecting (1226) at least some of the one or more frequencies in the first frequency band to be included in the new frequencies, based on the power amplifier information included in the first IDC message.

Method Embodiment 9 The method of Method Embodiment 1, wherein the first IDC assistance message includes UE power amplifier characteristic information (e.g. harmonic information indicating harmonics which may be generated and/or which frequencies in the first frequency band can amplified by the first communications device with less distortion than other frequencies in the first frequency band); and wherein said step of selecting (1222) said one or more new frequencies further includes selecting (1226) at least some of the one or more frequencies in the first frequency band to be included in the new frequencies, based on the power amplifier information included in the first IDC message.

Method Embodiment 10 The method of Method Embodiment 1, further comprising, prior to the network control device receiving (1216) the first IDC assistance message: detecting (1204), performed by the first communications device (e.g., first UE) said in-device coexistence problem, said first UE including multiple radio transceivers, at least one of the multiple radio transceivers being capable of operating at one or more frequencies in the first frequency band; generating (1206), in the first communications device, said first IDC assistance message; and transmitting (1214) the first IDC assistance message to the network control device (e.g., a gNB).

Method Embodiment 11 The method of Method Embodiment 10, further comprising: operating (1236) the first communications device to transmit data, using the one or more new frequencies, to the first network control device (e.g., gNB) for forwarding to another communications device (e.g., second UE) as part of a communications session between the first communications device and the another communications device.

Method Embodiment 12 The method of Method Embodiment 10, further comprising: operating (1238) the network control device (e.g., gNB) to receive the data transmitted by the first communications device (e.g. first UE) using the one or more new frequencies, from the first communications device, and forward it (e.g., via a communications network or via transmission over the air) to the another communications device (e.g., second UE).

Method Embodiment 13 The method of Method Embodiment 1, further comprising: receiving (1256), at the network control device (e.g., gNB), a panel switch message from a second communications device (e.g., UE) that supports space division multiplexing via the use of multiple antenna panels, said panel switch message including: i) a request that the network control device switch the antenna panel being used, by the second communications device, for uplink communications between the second communications device and the network control device or ii) a notification that the second communications device is switching the antenna panel being used, by the second communications device, for uplink communications between the second communications device and the network control device.

Method Embodiment 14 The method of Method Embodiment 13, wherein the panel switch message is a second in-device co-exitance (IDC) assistance message sent by the second communications device in response to determining that said second communications device (e.g., second UE) is suffering an in-device coexistence issue in frequencies above 52.6 GHZ.

Method Embodiment 15 The method of Method Embodiment 13, wherein the panel switch message includes information indicating one or a set of antenna panels that the second communications device is recommending switching to.

Method Embodiment 16 The method of Method Embodiment 15, further comprising: deciding (1264), at the network control device, in response to receiving the switch panel switch message including a request, to switch the second communications device to a different antenna panel for uplink communications (e.g., to the network control node, e.g., gNB); and transmitting (1268) to the second UE a switch instruction with an indication of the antenna panel to which the second UE is to switch for uplink communications.

Method Embodiment 17 The method of Method Embodiment 16, further comprising, selecting (1266) the antenna panel to which the second communications device is to switch from one or more antennal panels identified by the second communications device in said panel switch message.

Method Embodiment 18 The method of Method Embodiment 13, further comprising, prior to the network control device (e.g., gNB), receiving (1256) the panel switch message from the second communications device: detecting (1242), at the second communications device, an IDC problem which can be resolved by changing an antenna panel or panels used for uplink communications; generating (1244), at the second communications device, said panel switch message; and transmitting (1254) the panel switch message from the second communications device to the network control device.

Method Embodiment 19 The method of Method Embodiment 18, wherein generating (1244) said panel switch message includes: determining (1246), at the second communications device, (e.g., based on knowledge of the available antenna panels at the second communications device and/or knowledge of the direction or source of interference causing the IDC problem) one or more alternative antennal panels which can be used for uplink communication to avoid or reduce the detected IDC problem; and including (1248) in the panel switch message an indication of at last one panel which can be used by the second communications device to avoid or reduce the detected IDC problem.

Second Numbered List of Exemplary Method Embodiments

Method Embodiment 1 A communications method, the method comprising: operating (1215) a network control device (e.g. gNB) to monitor for messages; and receiving (1256), at the network control device (e.g., gNB), a panel switch message from a communications device (e.g., UE) that supports space division multiplexing via the use of multiple antenna panels, said panel switch message including: i) a request that the network control device switch the antenna panel being used, by the communications device, for uplink communications between the communications device and the network control device or ii) a notification that the communications device is switching the antenna panel being used, by the communications device, for uplink communications between the communications device and the network control device.

Method Embodiment 2 The method of Method Embodiment 1, wherein the panel switch message is an in-device co-existence (IDC) assistance message sent by the communications device in response to determining that said communications device (e.g., UE) is suffering an in-device coexistence issue in frequencies above 52.6 GHZ.

Method Embodiment 3 The method of Method Embodiment 1, wherein the panel switch message includes information indicating one or a set of antenna panels that the communications device is recommending switching to.

Method Embodiment 4 The method of Method Embodiment 3, further comprising: deciding (1264), at the network control device, in response to receiving the switch panel switch message including a request, to switch the communications device to a different antenna panel for uplink communications (e.g., to the network control node, e.g., gNB); and transmitting (1268) to the communications device (e.g., UE) a switch instruction with an indication of the antenna panel to which the communications device (e.g. UE) is to switch for uplink communications.

Method Embodiment 5 The method of Method Embodiment 4, further comprising, selecting (1266) the antenna panel to which the communications device (e.g. UE) is to switch from one or more antennal panels identified by the communications device in said panel switch message.

Method Embodiment 6 The method of Method Embodiment 1, further comprising, prior to the network control device (e.g., gNB), receiving (1256) the panel switch message from the communications device (e.g. UE): detecting, (1242) at the communications device, an IDC problem which can be resolved by changing an antenna panel or panels used for uplink communications; generating, (1244) at the communications device, said panel switch message; and transmitting (1254) the panel switch message from the communications device to the network control device.

Method Embodiment 7 The method of Method Embodiment 6, wherein generating (1244) said panel switch message includes: determining, (1246) at the communications device, (e.g., based on knowledge of the available antenna panels at the communications device and/or knowledge of the direction or source of interference causing the IDC problem) one or more alternative antennal panels which can be used for uplink communication to avoid or reduce the detected IDC problem; and including (1248) in the panel switch message an indication of at last one panel which can be used by the communications device to avoid or reduce the detected IDC problem.

Third Numbered List of Exemplary Method Embodiments

Method Embodiment 1 A communications method, the method comprising: receiving, at a network control device (e.g., a gNB), a first in-device coexistence (IDC) assistance message from a first communications device (e.g., a first UE) that detected an in-device coexistence problem, the first IDC assistance message indicating one or more of: i) preferred new frequency information indicating one or more new frequencies that first communications device would prefer to use in a first frequency band (e.g., within a 52.6 GHz to 71 GHz frequency band) to which the detected IDC problem relates; or ii) communications device (e.g., UE) power amplifier characteristic information indicating one or characteristics of a power amplifier include in the first communications device; selecting (e.g., determining) at the network control device one or more new frequencies to be used by the first communications device based on information included in said first IDC message, said one or new frequencies selected to be used by the first communications device differing in at least one frequency from one or more frequencies in said first communications band that were being used by said first communications device when said first communications device detected said in-device coexistence problem; and transmitting a response message to the first communications device indicating the selected one or more new frequencies in the first frequency band to be used by the first communications device.

Method Embodiment 2 The communications method of Method Embodiment 1, wherein said first frequency band is a New Radio (NR) frequency band that includes 52.6 GHz to 71 GHz.

Method Embodiment 3 The communications method of Method Embodiment 1, wherein said first IDC assistance message includes preferred new frequency information; and wherein said step of selecting said one or more new frequencies includes selecting at least one frequency indicated in the first IDC assistance message as a preferred frequency as one of said new frequencies.

Method Embodiment 4 The communications method of Method Embodiment 3, wherein said first IDC assistance message further includes communications device (e.g., UE) power amplifier characteristic information (e.g., harmonic information indicating harmonics which may be generated and/or frequencies in the first frequency band which can be amplified by the first communications device with less distortion than other frequencies in the first frequency band); and wherein said step of selecting one or more new frequencies further includes selecting at least some of the one or more frequencies in the first frequency band to be included in the new frequencies based on the power amplifier information included in the first IDC assistance message.

Method Embodiment 5 The communications method of Method Embodiment 1, wherein said first IDC assistance message further includes communications device (e.g., UE) power amplifier characteristic information (e.g., harmonic information indicating harmonics which may be generated and/or frequencies in the first frequency band which can be amplified by the first communications device with less distortion than other frequencies in the first frequency band); and wherein said step of selecting one or more new frequencies further includes selecting at least some of the one or more frequencies in the first frequency band to be included in the new frequencies based on the power amplifier information included in the first IDC assistance message.

Method Embodiment 6 The communications method of Method Embodiment 1, further comprising, prior to the network control device receiving the first IDC assistance message: detecting, performed by the first communications device (e.g., first UE), said in-device coexistence problem, said first communications device including multiple radio transceivers, at least one of the multiple radio transceivers being capable of operating at one or more frequencies in the first frequency band; generating, in the first communications device, said first IDC assistance message; and transmitting the first IDC assistance message to the network control device (e.g., a gNB).

Method Embodiment 7 The communications method of Method Embodiment 6, further comprising: operating the first communications device to transmit data, using the one or more new frequencies, to the first control device (gNB) for forwarding to a second communications device (e.g., second UE), as part of a communications session between the first communications device and the second communications device.

Method Embodiment 8 The communications method of Method Embodiment 6, further comprising: operating the network control device (e.g., gNB) to receive data transmitted by the first communications device, using the one or more new frequencies, from the first the first communications device and forward the data (e.g., via a communications network or via transmission over the air) to the second communications device.

Method Embodiment 9 The communications method of Method Embodiment 1, wherein the first IDC assistance message includes victim type indicating a wigig victim type.

Method Embodiment 10 The communications method of Method Embodiment 9, wherein the wigig victim type indicator indicates a victim type in the NR frequency band.

Method Embodiment 11 The communications method of Method Embodiment 1, further comprising: receiving, at the network control device (e.g., gNB), a panel switch message from a second communications device (e.g., another UE) that support space division multiplexing via the use of multiple transmission panels, said panel switch message including a request that the network control device switch the transmission panel being used for uplink communications between the second communications device and the network control device.

Method Embodiment 12 The communications method of Method Embodiment 11, wherein the panel switch method is a second in-device coexistence (IDC) assistance message send by the second communications device in response to the second communications device determining that the second communications device is suffering an in-device coexistence issue in frequencies above 52.6 GHz.

Method Embodiment 13 The communications method of Method Embodiment 11, wherein the panel switch message includes information indicating one or a set of panels that the second communications device (e.g. second UE) is recommending switching to.

Method Embodiment 14 The communications method of Method Embodiment 13, further comprising: deciding, at the network control device, in response to receiving the panel switch request, to switch the second communications device to a different antenna panel for uplink communications (e.g., to the network control node, e.g., gNB); and transmitting (from the network control device (e.g. gNB) to the second communications device (e.g. second UE) a switch instruction with an indication of the antenna panel to which the second communications device is to switch to for uplink communications.

Method Embodiment 15 The communications method of Method Embodiment 14 further comprising: selecting the antenna panel to which the second communications device is to switch to from one or more antenna panels identified by the second communications device in said panel switch message.

Method Embodiment 16 The communications method of Method Embodiment 11, further comprising, prior to the network control device (e.g. gNB), receiving the panel switch message from the second communications device: detecting, at the second communications device, and IDC problem which can be resolved by changing an antenna panel of panels used for uplink communications; generating, at the second communications device, said panel switch message; and transmitting the panel switch message from the second communications device to the network control device.

Method Embodiment 17 The communications method of Method Embodiment 16, wherein generating said panel switch message includes: determining, at the second communications device, (e.g., based on knowledge of the available antenna panels at the second communications device and/or knowledge of the direction or source of interference causing the IDC problem) one or more alternative antenna panels which can be used for uplink communication to avoid or reduce the detected IDC problem; and including in the panel switch message an indication of at least one panel which can be used by the second communications device to avoid or reduce the detected IDC problem.

First Numbered List of Exemplary System
Embodiments

System Embodiment 1 A communications system (1300) comprising: a network control device (e.g. a gNB) (1302 or 1400) including: a wireless receiver (1412); and a first processor (1402) configured to: operate the wireless receiver (1412) to receive (1216), at the network control device (e.g., gNB), a first in-device coexistence (IDC) assistance message from a first communications device (e.g., first UE) (1322 or 1500) that detected an in-device coexistence problem, the first IDC assistance message indicating a wigig victim type.

System Embodiment 2 The communications system (1300) of System Embodiment 1, wherein the wigig victim type indicator indicates a victim type in the NR frequency band.

System Embodiment 3 The communications system (1300) of System Embodiment 2, wherein said NR frequency band is within a frequency range of 52.6-71 GHz and is NR unlicensed.

System Embodiment 4 The communications system (1300) of System Embodiment 1, wherein the wigig victim type indicator indicates there is a in-device coexistence problem between a channel being used by the first communications device for Wi-Gig (sometimes referred to as 60 GHz WiFi or IEEE 802.11ad and/or 802.11ay) and a channel being used by the first communications device for NR (52.6-71 GHz) (sometimes referred to as 60 GHz NR).

System Embodiment 5 The communications system (1300) of System Embodiment 1, wherein the first IDC assistance message further indicates one or more of: i) preferred new frequency information indicating one or more new frequencies the first communicates device would prefer to use in a first frequency band (e.g., within a 52.6 GHz to 71 GHz frequency band) to which the detected IDC problem relates; or ii) UE power amplifier characteristic information indicating one or more characteristics of a power amplifier included in the first communications device; wherein said network control device (1302 or 1400) further includes: a wireless transmitter (1414); and wherein said first processor (1402) is further configured to: select (1216) (e.g., determining) at the network control device, one or more new frequencies to be used by the first communications device based on information included in said first IDC assistance message, said one or more new frequencies differing in at least one frequency from one or more frequencies in said first communications band that were being used by said first communications device when said first communications device detected said in-device coexistence problem; and operate the wireless transmitter (1414) to transmit (1232) a response message to the first communications device (1322) indicating the selected one or more new frequencies in the first frequency band to be used by the first communications device (1322).

System Embodiment 6 The communications system (1300) of System Embodiment 1, wherein the first frequency band is a New Radio (NR) frequency band that includes 52.6 GHz to 71 GHz.

System Embodiment 7 The communications system (1300) of System Embodiment 5, wherein the first IDC assistance message includes preferred new frequency information; and wherein said first processor (1402) is configured to: select (1224) at least one frequency indicated in the first IDC assistance message as a preferred frequency as one of said new frequencies, as part of being configured to select (1222) said one or more new frequencies.

System Embodiment 8 The communications system (1300) of System Embodiment 7, wherein the first IDC assistance message further includes UE power amplifier characteristic information (e.g. harmonic information indicating harmonics which may be generated and/or which frequencies in the first frequency band can amplified by the first communications device (1322) with less distortion than other frequencies in the first frequency band); and wherein said first processor (1402) is configured to: select (1226) at least some of the one or more frequencies in the first frequency band to be included in the new frequencies, based on the power amplifier information included in the first IDC message, as part of being configured to select (1222) said one or more new frequencies.

System Embodiment 9 The communications system (1300) of System Embodiment 1, wherein the first IDC assistance message includes UE power amplifier characteristic information (e.g. harmonic information indicating harmonics which may be generated and/or which frequencies in the first frequency band can amplified by the first communications device (1322) with less distortion than other frequencies in the first frequency band); and wherein said first processor (1402) is configured to: select (1226) at least some of the one or more frequencies in the first frequency band to be included in the new frequencies, based on the power amplifier information included in the first IDC message, as part of being configured to select (1222) said one or more new frequencies.

System Embodiment 10 The communications system (1300) of System Embodiment 1, further comprising: said first communications device (1322), said first communications device (1322) including: a second wireless transmitter (1518); and a second processor (1502); and wherein said second processor (1502) is configured to: prior to the network control device receiving (1216) the first IDC assistance message, operate the first communications device (e.g., first UE) (1322) to detect (1204) said in-device coexistence problem, said first communications device including multiple radio transceivers, at least one of the multiple radio transceivers being capable of operating at one or more frequencies in the first frequency band; generate (1206), in the first communications device (1322), said first IDC assistance message; and operate the second wireless transmitter (1534) to transmit (1214) the first IDC assistance message to the network control device (e.g., a gNB).

System Embodiment 11 The communications system (1300) of System Embodiment 10, wherein said second processor (1502) is further configured to: operate (1236) the first communications device (1322) to transmit data, using the one or more new frequencies, to the first network control device (e.g., gNB) for forwarding to another communications device (e.g., second UE) (1324 or 1336) as part of a communications session between the first communications device (1322) and the another communications device (1324 or 1336).

System Embodiment 12 The communications system (1300) of System Embodiment 10, wherein said first processor (1402) is further configured to: operate (1238) the network control device (e.g., gNB) (1302) to receive the data transmitted by the first communications device (e.g. first UE) (1322) using the one or more new frequencies, from the first communications device (1322), and forward it (e.g., via a communications network or via transmission over the air) to the another communications device (e.g., second UE) (1324 or 1336).

System Embodiment 13 The communications system (1300) of System Embodiment 1, wherein said first processor (1402) is further configured to: operate the first receiver (1412) to receive (1256), at the network control device (e.g., gNB) (1302), a panel switch message from a second communications device (e.g., UE) (1324) that supports space division multiplexing via the use of multiple antenna panels, said panel switch message including: i) a request that the network control device (1322) switch the antenna panel being used, by the second communications device (1324), for uplink communications between the second communications device (1324) and the network control device (1302) or ii) a notification that the second communications device (1324) is switching the antenna panel being used, by the second communications device (1324), for uplink communications between the second communications device (1324) and the network control device (1302).

System Embodiment 14 The communications system (1300) of System Embodiment 13, wherein the panel switch message is a second in-device co-existence (IDC) assistance message sent by the second communications device (1324) in response to determining that said second communications device (e.g., second UE) (1324) is suffering an in-device coexistence issue in frequencies above 52.6 GHZ.

System Embodiment 15 The communications system (1300) of System Embodiment 13, wherein the panel switch message includes information indicating one or a set of antenna panels that the second communications device (1324) is recommending switching to.

System Embodiment 16 The communications system (1300) of System Embodiment 15, wherein said network control device (1302) further includes a wireless transmitter (1414); and wherein said first processor (1402) is further configured to: decide (1264), at the network control device (1302), in response to receiving the switch panel switch message including a request, to switch the second communications device (1324) to a different antenna panel for uplink communications (e.g., to the network control node, e.g., gNB); and operate the wireless transmitter (1414) to transmit (1268) to the second communications device (e.g., second UE) (1324) a switch instruction with an indication of the antenna panel to which the second communications device (e.g., second UE) (1324) is to switch for uplink communications.

System Embodiment 17 The communications system (1300) of System Embodiment 16, wherein said first processor (1402) is further configured to: select (1266) the antenna panel to which the second communications device is to switch from one or more antennal panels identified by the second communications device (1324) in said panel switch message.

System Embodiment 18 The communications system (1300) of System Embodiment 13, further comprising: said second communications device (1324 or 1500); said second communications device (1324) including: a wireless transmitter (1518); and a second processor (1502); and wherein said second processor (1502) is configured to: prior to the network control device (e.g., gNB) (1302), receiving (1256) the panel switch message from the second communications device (1324), operate the second communications device (1324) to detect (1242) an IDC problem which can be resolved by changing an antenna panel or panels used for uplink communications; generate (1244), at the second communications device (1324), said panel switch message; and operate the wireless transmitter (1518) to transmit (1254) the panel switch message from the second communications device (1324) to the network control device (1302).

System Embodiment 19 The communications system (1300) of System Embodiment 18, wherein said second processor (1502) is configured to: determine (1246), at the second communications device (1324), (e.g., based on knowledge of the available antenna panels at the second communications device (1324) and/or knowledge of the direction or source of interference causing the IDC problem) one or more alternative antenna panels which can be used for uplink communication to avoid or reduce the detected IDC problem;

and include (1248) in the panel switch message an indication of at last one panel which can be used by the second communications device (1324) to avoid or reduce the detected IDC problem, as part of being configured to generate (1244) said panel switch message.

Second Numbered List of Exemplary System Embodiments

System Embodiment 1 A communications system (1300) comprising: a network control device (e.g., gNB) (1302 or 1400) including: a wireless receiver (1412); and a first processor (1402) configured to operate the wireless receiver (1412) to receive (1256), at the network control device (e.g., gNB), a panel switch message from a communications device (e.g., UE) (1324 or 1500) that supports space division multiplexing via the use of multiple antenna panels, said panel switch message including: i) a request that the network control device (1302) switch the antenna panel being used, by the communications device (1324), for uplink communications between the communications device (1324) and the network control device (1302) or ii) a notification that the communications device (1324) is switching the antenna panel being used, by the communications device (1324), for uplink communications between the communications device (1324) and the network control device (1302).

System Embodiment 2 The communications system (1300) of System Embodiment 1, wherein the panel switch message is an in-device co-existence (IDC) assistance message sent by the communications device (1324) in response to determining that said communications device (e.g., UE) is suffering an in-device coexistence issue in frequencies above 52.6 GHZ.

System Embodiment 3 The communications system (1300) of System Embodiment 1, wherein the panel switch message includes information indicating one or a set of antenna panels that the communications device (1324) is recommending switching to.

System Embodiment 4 The communications system (1300) of System Embodiment 3, wherein said network control device (1302) further includes a wireless transmitter (1414); and wherein said first processor (1402) is further configured to: decide (1264), at the network control device (1302), in response to receiving the switch panel switch message including a request, to switch the communications device (1324) to a different antenna panel for uplink communications (e.g., to the network control node, e.g., gNB); and operate the wireless transmitter (1414) to transmit (1268) to the communications device (e.g., UE) (1324) a switch instruction with an indication of the antenna panel to which the communications device (e.g., UE) (1324) is to switch for uplink communications.

System Embodiment 5 The communications system (1300) of System Embodiment 4, wherein said first processor (1402) is further configured to: select (1266) the antenna panel to which the communications device (e.g., UE) (1324)

is to switch from one or more antenna panels identified by the communications device (1324) in said panel switch message.

System Embodiment 6 The communications system (1300) of System Embodiment 1, wherein said communications system (1300) further comprises: said communications device (e.g. UE) (1324) including: a second processor (1502); and a second transmitter (1518); and wherein said second processor (1502) is configured to: prior to the network control device (e.g., gNB) (1302), receiving (1256) the panel switch message from the communications device (e.g., UE) (1324), operate the communications device (1324) to detect (1242) an IDC problem which can be resolved by changing an antenna panel or panels used for uplink communications; generate, (1244) said panel switch message; and operate the second transmitter (1518) to transmit (1254) the panel switch message from the communications device (1524) to the network control device (1302).

System Embodiment 7 The communications system (1300) of System Embodiment 6, wherein said second processor (1502) is configured to: determine, (1246) at the communications device (1324), (e.g., based on knowledge of the available antenna panels at the communications device and/or knowledge of the direction or source of interference causing the IDC problem) one or more alternative antenna panels which can be used for uplink communication to avoid or reduce the detected IDC problem; and include (1248) in the panel switch message an indication of at last one panel which can be used by second communications device (1324) to avoid or reduce the detected IDC problem, as part of being configured to generate (1244) said panel switch message.

Third Numbered List of Exemplary System Embodiments

System Embodiment 1 A communications system comprising: a network control device including: a first processor; a first wireless receiver; and a first wireless transmitter; and wherein said first processor is configured to: operate the network control device to receive (via the first wireless receiver) a first in-device coexistence (IDC) assistance message from a first communications device (e.g., a first UE) that detected an in-device coexistence problem, the first IDC assistance message indicating one or more of: i) preferred new frequency information indicating one or more new frequencies that first communications device would prefer to use in a first frequency band (e.g., within a 52.6 GHz to 71 GHz frequency band) to which the detected IDC problem relates; or ii) communications device (e.g., UE) power amplifier characteristic information indicating one or characteristics of a power amplifier include in the first communications device; select (e.g., determine) one or more new frequencies to be used by the first communications device based on information included in said first IDC message, said one or new frequencies selected to be used by the first communications device differing in at least one frequency from one or more frequencies in said first communications band that were being used by said first communications device when said first communications device detected said in-device coexistence problem; and operate the network control device to transmit (via the first wireless transmitter) a response message to the first communications device indicating the selected one or more new frequencies in the first frequency band to be used by the first communications device.

Method Embodiment 2 The communications system of System Embodiment 1, wherein said first frequency band is a New Radio (NR) frequency band that includes 52.6 GHz to 71 GHz.

Method Embodiment 3 The communications system of System Embodiment 1, wherein said first IDC assistance message includes preferred new frequency information; and wherein said first processor is configured to select at least one frequency indicated in the first IDC assistance message as a preferred frequency as one of said new frequencies, as part of being configured to select said one or more new frequencies.

Method Embodiment 4 The communications system of System Embodiment 3, wherein said first IDC assistance message further includes communications device (e.g., UE) power amplifier characteristic information (e.g., harmonic information indicating harmonics which may be generated and/or frequencies in the first frequency band which can be amplified by the first communications device with less distortion than other frequencies in the first frequency band); and wherein said first processor is configured to select at least some of the one or more frequencies in the first frequency band to be included in the new frequencies based on the power amplifier information included in the first IDC assistance message, as part of being configured to select one or more new frequencies.

System Embodiment 5 The communications system of System Embodiment 1, wherein said first IDC assistance message further includes communications device (e.g., UE) power amplifier characteristic information (e.g., harmonic information indicating harmonics which may be generated and/or frequencies in the first frequency band which can be amplified by the first communications device with less distortion than other frequencies in the first frequency band); and wherein said first processor is configured to select at least some of the one or more frequencies in the first frequency band to be included in the new frequencies based on the power amplifier information included in the first IDC assistance message, as part of being configured to select one or more new frequencies.

System Embodiment 6 The communications system of System Embodiment 1, further comprising: said first communications device, said first communications device including a second processor and a second wireless transmitter, and wherein said second processor is configured to: prior to the network control device receiving the first IDC assistance message, detect at the first communications device (e.g., first UE), said in-device coexistence problem, said first communications device including multiple radio transceivers, at least one of the multiple radio transceivers being capable of operating at one or more frequencies in the first frequency band; generate, in the first communications device, said first IDC assistance message; and operate the first communications device to transmit (via the second wireless transmitter) the first IDC assistance message to the network control device (e.g., a gNB).

System Embodiment 7 The communications system of System Embodiment 6, wherein said second processor is further configured to: operate the first communications device to transmit data, (via the second wireless transmitter) using the one or more new frequencies, to the first control device (gNB) for forwarding to a second communications device (e.g., second UE), as part of a communications session between the first communications device and the second communications device.

System Embodiment 8 The communications system of System Embodiment 6, wherein said first process is further configured to: operate the network control device (e.g., gNB) to receive (via the first wireless transmitter) data transmitted by the first communications device, using the one or more new frequencies, from the first the first communications device and forward the data (e.g., via a communications network or via transmission over the air) to the second communications device.

System Embodiment 9 The communications system of System Embodiment 1, wherein the first IDC assistance message includes victim type indicating a wigig victim type.

System Embodiment 10 The communications system of System Embodiment 9, wherein the wigig victim type indicator indicates a victim type in the NR frequency band.

System Embodiment 11 The communications system of System Embodiment 1, wherein said first processor is further configured to: operate the network control device (e.g., gNB) to receive (via the first wireless receiver) a panel switch message from a second communications device (e.g., another UE) that supports space division multiplexing via the use of multiple transmission panels, said panel switch message including a request that the network control device switch the transmission panel being used for uplink communications between the second communications device and the network control device.

System Embodiment 12 The communications system of System Embodiment 11, wherein the panel switch method is a second in-device coexistence (IDC) assistance message send by the second communications device in response to the second communications device determining that the second communications device is suffering an in-device coexistence issue in frequencies above 52.6 GHz.

System Embodiment 13 The communications system of System Embodiment 11, wherein the panel switch message includes information indicating one or a set of panels that the second communications device (e.g. second UE) is recommending switching to.

System Embodiment 14 The communications system of System Embodiment 13, wherein said first processor is further configured to: decide, at the network control device, in response to receiving the panel switch request, to switch the second communications device to a different antenna panel for uplink communications (e.g., to the network control node, e.g., gNB); and operate the network control device to transmitting (via the first wireless transmitter) (from the network control device (e.g. gNB) to the second communications device (e.g. second UE) a switch instruction with an indication of the antenna panel to which the second communications device is to switch to for uplink communications.

System Embodiment 15 The communications system of System Embodiment 14 wherein said first processor is further configured to: select the antenna panel to which the second communications device is to switch to from one or more antenna panels identified by the second communications device in said panel switch message.

System Embodiment 16 The communications system of System Embodiment 11, wherein said second processor is further configured to, prior to the network control device (e.g. gNB), receiving the panel switch message from the second communications device, operate the second communications device to detect, at the second communications device, and IDC problem which can be resolved by changing an antenna panel of panels used for uplink communications; generate, at the second communications device, said panel switch message; and operate the second wireless transmitter to transmit the panel switch message from the second communications device to the network control device.

System Embodiment 17 The communications system of System Embodiment 16, wherein said second processor is configured to: determine, at the second communications device, (e.g., based on knowledge of the available antenna panels at the second communications device and/or knowledge of the direction or source of interference causing the IDC problem) one or more alternative antenna panels which can be used for uplink communication to avoid or reduce the detected IDC problem, as part of being configured to generate said panel switch message includes; and include in the panel switch message an indication of at least one panel which can be used by the second communications device to avoid or reduce the detected IDC problem.

Numbered List of Exemplary Non-Transitory

Computer Readable Medium Embodiments

Non-Transitory Computer readable medium Embodiment 1 A non-transitory computer readable medium including computer executable instruction which when executed by a processor of a network control device (e.g. gNB) cause the network control device to perform the steps of: operating (1215) the network control device (e.g. gNB) to monitor for messages; and receiving (1216), at the network control device (e.g., gNB), a first in-device coexistence (IDC) assistance message from a first communications device (e.g., first UE) that detected an in-device coexistence problem, the first IDC assistance message indicating a wigig victim type.

Non-Transitory Computer readable medium Embodiment 2 A non-transitory computer readable medium including computer executable instruction which when executed by a processor of a network control device (e.g. gNB) cause the network control device to perform the steps of: operating (1215) a network control device (e.g. gNB) to monitor for messages; and receiving (1256), at the network control device (e.g., gNB), a panel switch message from a communications device (e.g., UE) that supports space division multiplexing via the use of multiple antenna panels, said panel switch message including: i) a request that the network control device switch the antenna panel being used, by the communications device, for uplink communications between the communications device and the network control device or ii) a notification that the communications device is switching the antenna panel being used, by the communications device, for uplink communications between the communications device and the network control device.

Non-Transitory Computer readable medium Embodiment 3 A non-transitory computer readable medium including computer executable instruction which when executed by a processor of a network control device (e.g. gNB) cause the network control device to perform the steps of: receiving, at a network control device (e.g., a gNB), a first in-device coexistence (IDC) assistance message from a first communications device (e.g., a first UE) that detected an in-device coexistence problem, the first IDC assistance message indicating one or more of: i) preferred new frequency information indicating one or more new frequencies that first communications device would prefer to use in a first frequency band (e.g., within a 52.6 GHz to 71 GHz frequency band) to which the detected IDC problem relates; or ii) communications device (e.g., UE) power amplifier characteristic information indicating one or characteristics of a power amplifier include in the first communications device; selecting (e.g., determining) at the network control device one or more new frequencies to be used by the first communications device based on information included in said first IDC message, said one or new frequencies selected to be used by the first communications device differing in at least one frequency from oner or more frequencies in said first communications band that were being used by said first communications device when said first communications device detected said in-device coexistence problem; and transmitting a response message to the first communications device indicating the selected one or more new frequencies in the first frequency band to be used by the first communications device.

Various embodiments are directed to apparatus, e.g., user devices such as a user equipment (UE) device, e.g., a UE including multiple wireless transceivers and supporting communications in the frequency range of 52.6 GHz-71 GHz and/or including multiple antenna panels, base stations (macro cell base stations and small cell base stations) such as a gNB, eNB, or ng-eNB, Integrated access and backhaul (IAB) nodes with UE functionality, CBSDs, network network control devices, e.g., gNBs, nodes, HSS devices, relay devices, e.g. MMEs, a SAS, an AMF device, servers, customer premises equipment devices, cable systems, network nodes, gateways, cable headend/hubsites, network monitoring node/servers, cluster controllers, cloud nodes, production nodes, cloud services servers and/or network equipment devices.

Various embodiments are also directed to methods, e.g., method of controlling and/or operating user devices (UEs), IAB nodes, network control devise, e.g., gNBs, base stations, e.g., gNB, eNB and CBSDs, gateways, servers (HSS server), MMEs, SAS, cable networks, cloud networks, nodes, servers, cloud service servers, customer premises equipment devices, controllers, network monitoring nodes/servers and/or cable or network equipment devices. Various embodiments are directed to and well suited for communications systems and/or communications networks using licensed and/or unlicensed spectrum, e.g. at or above 52.6 GHz such as in the frequency range of 52.6 GHz-71 GHz, in which communications devices e.g., new radio (NR) UEs equipped with two transceivers such as IEEE 802.11 ad/ay radio and NR cellular operating in 52.6 GHz-71 GHz may perceive IDC issues. Various embodiments are directed to and well suited for communications systems and/or communications networks using unlicensed spectrum, e.g. communications systems which support Industrial Internet of Things (IIoT) communications and/or ultra-reliable low latency communications (URLLC). Various embodiments are directed to communications network which are partners, e.g. a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., UE, a IAB node, a network control device such as a base station, e.g. a gNB, a MVNO base station such as a CBRS base station, e.g. a CBSD, an device such as a cellular base station e.g., a gNB, an eNB, a HSS server, a relay device, e.g. a MME, SAS, etc., said device including a processor configured to implement one, multiple or all of the steps of one or more methods of the invention.

In some embodiments, the processor or processors, e.g., CPUs, of one or more devices, e.g., communications nodes such as e.g., a UE, a IAB node, a network control device, e.g. a base station such as a gNB, MVNO base station such as a CBRS base station, e.g. a CBSD, an device such as a cellular base station e.g., a gNB, eNB, a HSS device server, a relay device, e.g. a MME, a SAS, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as e.g., a network control device, a MVNO base station such as a CBRS base station, e.g. a CBSD, an device such as a cellular base station e.g., a gNB, eNB, a HSS server, a HSS device server, a UE device, a IAB node, a relay device, e.g. a MME, includes a component corresponding to each of one or more of the steps of the various described methods performed by the device in which the processor is included. In some but not all embodiments a device, e.g., as e.g., a MVNO base station such as a CBRS base station, e.g. a CBSD, an device such as a cellular base station e.g., a gNB, an eNB, a MNO HSS server, a MVNO HSS device server, a UE device, a relay device, e.g a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a network control device, e.g., a gNB, a UE, a IAB node, a MNVO base station, e.g., a CBSD, a MNO cellular base station, e.g., an eNB or a gNB, a HSS server, a UE device, a SAS or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising: operating a network control device to monitor for messages; and
    receiving, at the network control device, a first in-device coexistence (IDC) assistance message from a first communications device that detected an in-device coexistence problem, the first IDC assistance message indicating a wigig victim type.

2. The method of claim 1, wherein the first IDC assistance message includes preferred new frequency information; and wherein the method further comprises:
    selecting, at the network control device, one or more new frequencies, said step of selecting one or more new frequencies including selecting at least one frequency, indicated in the first IDC assistance message as a preferred frequency, as one of said new frequencies.

3. The method of claim 2, wherein the first IDC assistance message further includes UE power amplifier characteristic information; and
    wherein said step of selecting said one or more new frequencies further includes selecting at least some of one or more frequencies in a first frequency band to be included in the new frequencies, based on the UE power amplifier characteristic information included in the first IDC assistance message.

4. The method of claim 1, wherein the first IDC assistance message includes UE power amplifier characteristic information; and wherein the method further comprises:
    selecting, at the network control device, one or more new frequencies, said step of selecting one or more new frequencies including selecting at least some of one or more frequencies in a first frequency band to be included in the new frequencies, based on the UE power amplifier characteristic information included in the first IDC assistant message.

5. The method of claim 1, further comprising, prior to the network control device receiving the first IDC assistance message:
    detecting, performed by the first communications device, said in-device coexistence problem, said first communications device including multiple radio transceivers, at least one of the multiple radio transceivers being capable of operating at one or more frequencies in a first frequency band;
    generating, in the first communications device, said first IDC assistance message; and
    transmitting, the first IDC assistance message to the network control device.

6. The method of claim 5, further comprising:
    operating the first communications device to transmit data, using one or more new frequencies, to the first network control device for forwarding to another communications device as part of a communications session between the first communications device and the another communications device.

7. The method of claim 1, further comprising: receiving, at the network control device, a panel switch message from a second communications device that supports space division multiplexing via the use of multiple antenna panels, said panel switch message including; i) a request that the network control device switch the antenna panel being used, by the second communications device, for uplink communications between the second communications device and the network control device or ii) a notification that the second communications device is switching the antenna panel being used, by the second communications device, for uplink communications between the second communications device and the network control device.

8. A communications system comprising:
    a network control device including:
        a wireless receiver; and
        a first processor configured to:
            operate the wireless receiver to receive, at the network control device, a first in-device coexistence (IDC) assistance message from a first communications device that detected an in-device coexistence problem, the first IDC assistance message indicating a wigig victim type.

9. The communications system of claim 8, wherein the first IDC assistance message includes preferred new frequency information; and
    wherein said first processor is configured to:
    select one or more new frequencies including selecting at least one frequency, indicated in the first IDC assistance message as a preferred frequency, as one of said new frequencies.

10. The communications system of claim 9, wherein the first IDC assistance message further includes UE power amplifier characteristic information; and wherein said first processor is configured to:
select one or more new frequencies including selecting at least some of one or more frequencies in a first frequency band to be included in the new frequencies, based on the UE power amplifier characteristic information included in the first IDC assistance message.

11. A communications method, the method comprising:
operating a network control device to monitor for messages; and
receiving, at the network control device, a panel switch message from a communications device that supports space division multiplexing via the use of multiple antenna panels, said panel switch message including: i) a request that the network control device switch the antenna panel being used, by the communications device, for uplink communications between the communications device and the network control device or ii) a notification that the communications device is switching the antenna panel being used, by the communications device, for uplink communications between the communications device and the network control device.

12. The method of claim 11, wherein the panel switch message is an in-device co-existence (IDC) assistance message sent by the communications device in response to determining that said communications device is suffering an in-device coexistence issue in frequencies above 52.6 GHz.

13. The method of claim 11, wherein the pan& switch message includes information indicating one or a set of antenna panels that the communications device is recommending switching to.

14. The method of claim 13, further comprising:
deciding, at the network control device, in response to receiving the switch panel switch message including a request, to switch the communications device to a different antenna panel for uplink communications; and
transmitting to the communications device a switch instruction with an indication of the antenna panel to which the communications device is to switch for uplink communications.

15. The method of claim 14, further comprising: selecting the antenna panel, to which the communications device is to switch, from one or more antenna panels identified by the communications device in said panel switch message.

16. The method of claim 11, further comprising, prior to the network control device receiving the panel switch message from the communications device:

detecting, at the communications device, an IDC problem which can be resolved by changing an antenna panel or panels used for uplink communications;
generating, at the communications device, said panel switch message; and
transmitting the panel switch message from the communications device to the network control device.

17. The method of claim 16, wherein generating said panel switch message includes;
determining, at the communications device, one or more alternative antenna panels which can be used for uplink communication to avoid or reduce the detected IDC problem; and
including in the panel switch message an indication of at least one panel which can be used by the communications device to avoid or reduce the detected iDC problem.

18. A communications system comprising:
a network control device including:
a wireless receiver; and
a first processor configured to operate the wireless receiver to receive, at the network control device, a panel switch message from a communications device that supports space division multiplexing via the use of multiple antenna panels, said panel switch message including: i) a request that the network control device switch the antenna panel being used, by the communications device, for uplink communications between the communications device and the network control device or a notification that the communications device is switching the antenna panel being used, by the communications device, for uplink communications between the communications device and the network control device.

19. The communications system of claim 18, wherein the panel switch message is an in-device co-existence (DC) assistance message sent by the communications device in response to determining that said communications device is suffering an in-device coexistence issue in frequencies above 52.6 GHz.

20. The communications system of claim 18, wherein the panel switch message includes information indicating one or a set of antenna panels that the communications device is recommending switching to.

* * * * *